(12) United States Patent
Takeuchi et al.

(10) Patent No.: US 8,793,060 B2
(45) Date of Patent: Jul. 29, 2014

(54) CONTROL APPARATUS FOR AUTOMATIC STOP OF ENGINE

(75) Inventors: Takayuki Takeuchi, Nukata-gun (JP); Kenji Kawahara, Kariya (JP); Hiroshi Morimoto, Chiryu (JP); Takahiro Naito, Anjo (JP); Takanori Sasaki, Kariya (JP)

(73) Assignee: Denso Corporation, Kariya (JP)

( * ) Notice: Subject to any disclaimer, the term of this patent is extended or adjusted under 35 U.S.C. 154(b) by 323 days.

(21) Appl. No.: 13/307,687

(22) Filed: Nov. 30, 2011

(65) Prior Publication Data
US 2012/0136553 A1    May 31, 2012

(30) Foreign Application Priority Data

Nov. 30, 2010 (JP) .................. 2010-267166
Feb. 23, 2011 (JP) .................. 2011-036767

(51) Int. Cl.
*F02N 11/08* (2006.01)
*F02N 11/00* (2006.01)
*F02D 17/04* (2006.01)
*B60W 20/00* (2006.01)

(52) U.S. Cl.
CPC ........ *F02N 11/0814* (2013.01); *F02N 11/0818* (2013.01); *F02D 17/04* (2013.01); *B60W 20/00* (2013.01)
USPC ..................... 701/112; 123/179.4

(58) Field of Classification Search
CPC ........... F02N 11/0814; F02N 11/0818; B60W 20/00; F02D 17/04
USPC ............ 701/102, 112, 113; 123/179.3, 179.4, 123/179.1, 198 DB, 325, 332
See application file for complete search history.

(56) References Cited

U.S. PATENT DOCUMENTS

2006/0212212 A1    9/2006 Akasaka
2012/0089317 A1*   4/2012 Herbolzheimer ............. 701/102

FOREIGN PATENT DOCUMENTS

| EP | 1564403 A2 * | 8/2005 |
|---|---|---|
| JP | A-6-200791 | 7/1994 |
| JP | A-2004-169664 | 6/2004 |
| JP | A-2010-185345 | 8/2010 |

OTHER PUBLICATIONS

EP1564403 (Mathias Holz) Mar. 26, 2014 (machine translation), [online][retrieved on Mar. 26, 2014], Retrieved from EPO.*
Dec. 4, 2013 Office Action issued in Chinese Patent Application No. 201110391523.X (with translation).
Feb. 12, 2014 Office Action issued in Japanese Patent Application No. 2011-036767 (with translation).

\* cited by examiner

*Primary Examiner* — Mahmoud Gimie
(74) *Attorney, Agent, or Firm* — Oliff PLC

(57) ABSTRACT

A control apparatus controls an automatic stop of an engine mounted on a vehicle so as to automatically stop the engine if a predetermined stop condition is satisfied, the stop condition including a condition that a running speed of the vehicle is a prescribed speed or less. The control apparatus includes a prediction unit and a prohibition unit. The prediction unit predicts whether or not the next automatic stop time of the engine is less than a prescribed time capable of obtaining a fuel saving benefit based on a history of a vehicle stop time or an automatic stop time of the engine. The prohibition unit prohibits the next automatic stop of the engine if the prediction unit predicts that the next automatic stop time of the engine is less than the prescribed time.

20 Claims, 19 Drawing Sheets

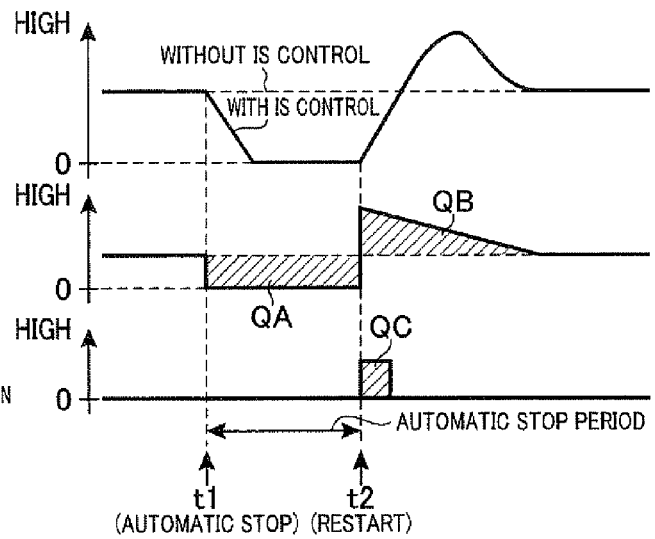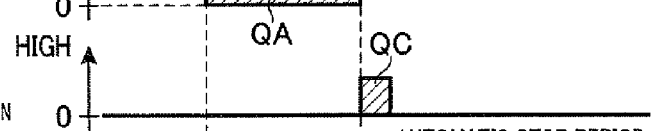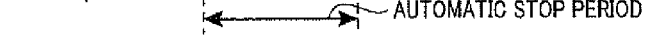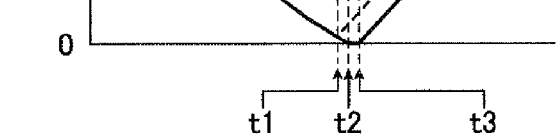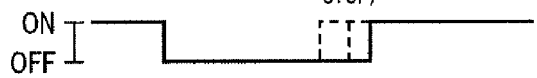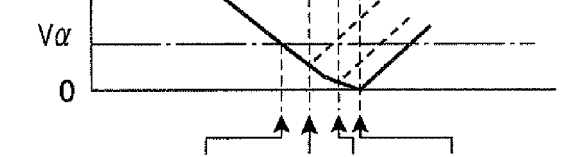

VEHICLE STOP TIME IN NON-ARTERIAL ROAD

VEHICLE STOP TIME IN ARTERIAL ROAD

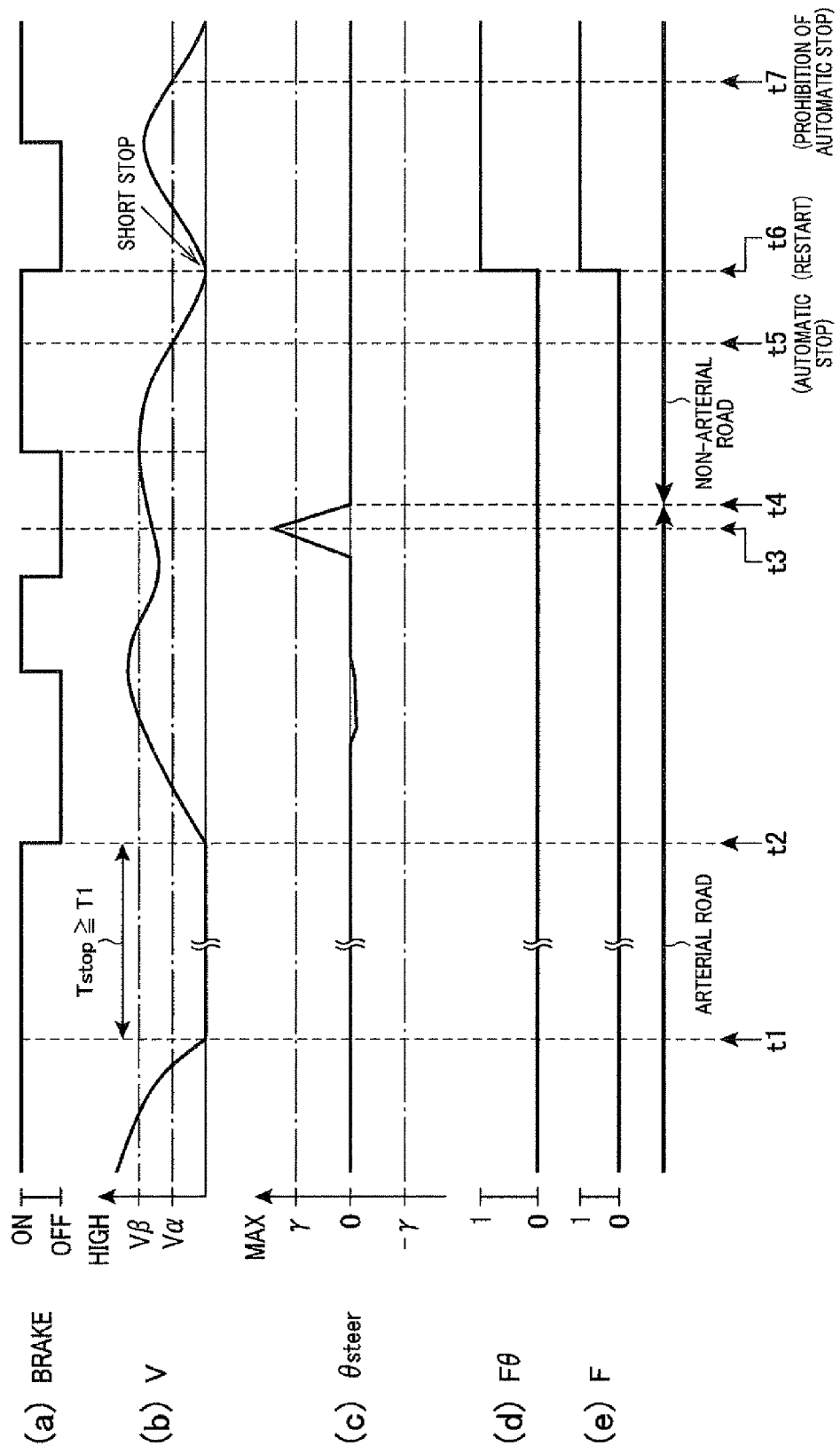

INTERVAL OF TRAVEL TIME

INTERVAL OF TRAVEL DISTANCE

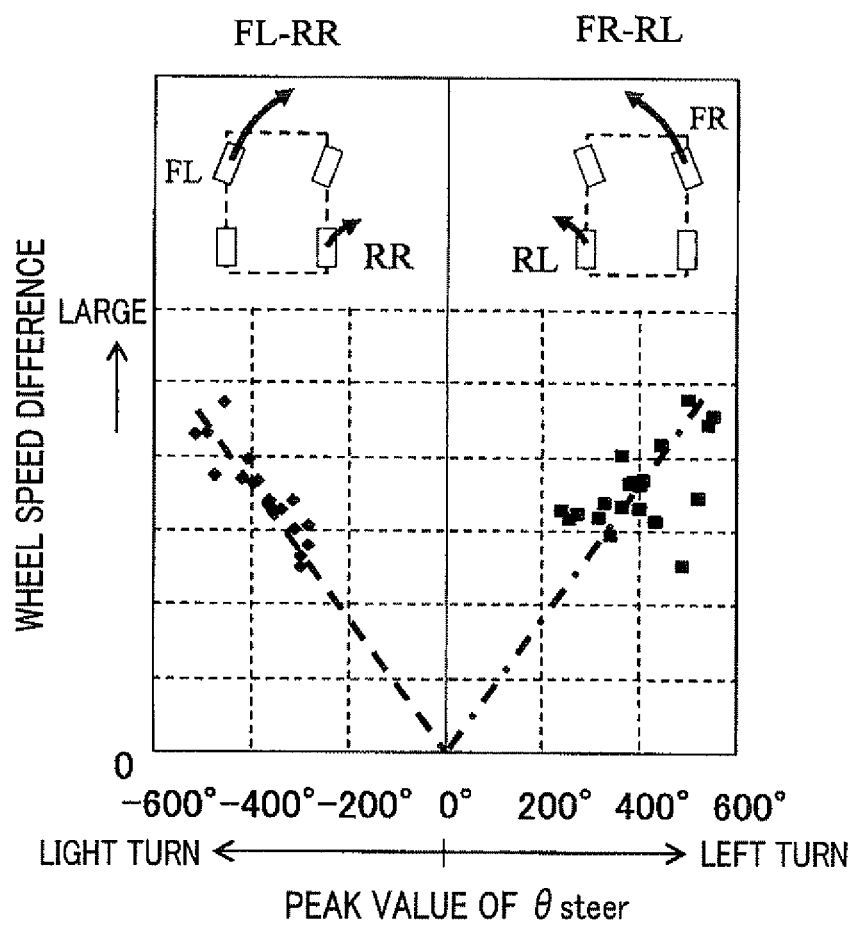

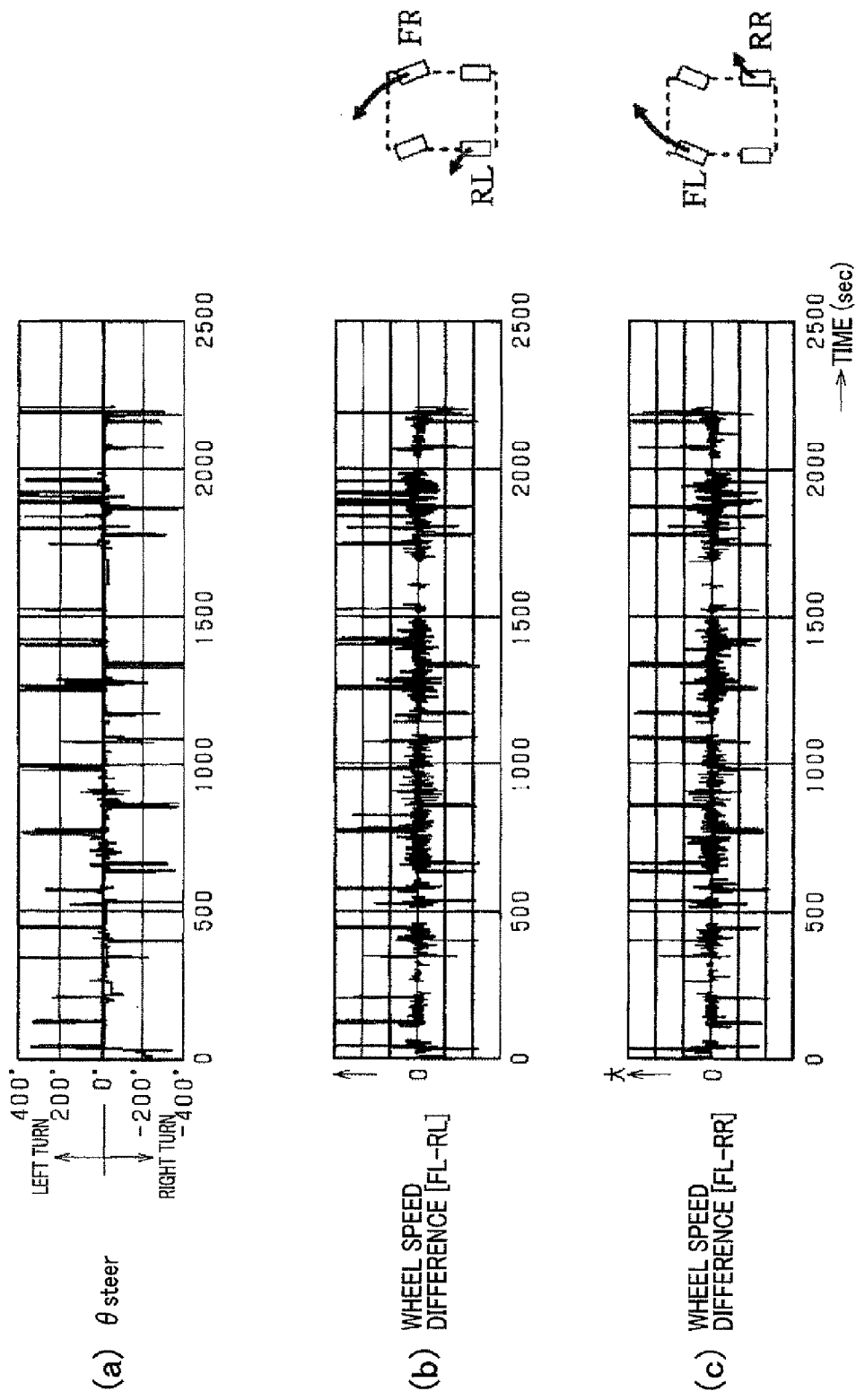

CONTROL APPARATUS FOR AUTOMATIC STOP OF ENGINE

CROSS-REFERENCE TO RELATED APPLICATION

This application is based on and claims the benefit of priority from earlier Japanese Patent Application No. 2010-267166 filed Nov. 30, 2010 and Japanese Patent Application No. 2011-036767 filed Feb. 23, 2011, the description of which is incorporated herein by reference.

BACKGROUND OF THE INVENTION

1. Technical Field of the Invention

The present invention relates to a control apparatus for an automatic stop of an engine, and in particular, to the automatic stop control apparatus that automatically stops an on-board engine mounted in a vehicle if a predetermined stop condition is satisfied, the stop condition including a condition that a running speed of the vehicle is a prescribed speed or less.

2. Related Art

Conventionally, so called an "idle stop control" is known to automatically stop an engine if a predetermined stop condition is satisfied, and subsequently to automatically restart the engine if a predetermined restart condition is satisfied. This control can improve fuel saving benefit of the engine.

However, if the automatic stop time of the engine due to the idle stop control is short, the fuel saving benefit may be degraded.

A technique for solving the above problem is known to prohibit only automatic stop operation in a predetermined time immediately after the engine is restarted, as disclosed in e.g., Japanese Patent laid-open Publication No. 06-200791. Specifically, the above predetermined time during which automatic stop operation is prohibited immediately after the restart of the engine is changed based on the number of previous automatic stops of the engine. This can reduce the automatic stop of the engine in a situation in which the automatic stop time of the engine may become short because, e.g., automatic stop and restart of the engine are repeated in a short period of time, thereby reducing degradation of the fuel saving benefit.

However, the above technique cannot allow the engine to automatically stop after properly recognizing whether or not there is a situation in which automatic stop time becomes short. For example, despite a situation in which sufficient automatic stop time of the engine can be secured, the engine cannot be automatically stopped. In this case, the fuel saving benefit may be degraded.

SUMMARY OF THE INVENTION

The present invention has been made in order to solve the problem mentioned above, and has as its exemplary object to provide a control apparatus for an automatic stop of an engine capable of properly reducing degradation of fuel saving benefit.

Hereinafter, means for solving the above problem, its operation and effect will be described.

According to a exemplary aspect of the present invention, there is provided a control apparatus for controlling an automatic stop of an engine mounted on a vehicle so as to automatically stop the engine if a predetermined stop condition is satisfied, the stop condition including a condition that a running speed of the vehicle is a prescribed speed or less, the control apparatus comprising: a prediction unit that predicts whether or not the next automatic stop time of the engine is less than a prescribed time capable of obtaining a fuel saving benefit based on a history of a vehicle stop time or an automatic stop time of the engine; and a prohibition unit that prohibits the next automatic stop of the engine if the prediction unit predicts that the next automatic stop time of the engine is less than the prescribed time.

The inventors found out that it is possible to predict whether or not the next automatic stop time of the engine becomes short, and whether or not a fuel saving benefit due to the automatic stop of the engine can be obtained based on a history of a vehicle stop time or an automatic stop time of the engine. From this, in the above exemplary aspect, it is predicted whether or not the next automatic stop time of the engine is less than a prescribed time. As a result, if it is predicted that the next automatic stop time of the engine would be less than a prescribed time, the next automatic stop of the engine is prohibited. This makes it possible to reduce occurrence of a situation where the engine is automatically stopped if the automatic stop time will be short, thereby properly reducing degradation of fuel saving benefit of the engine.

The prediction unit may predict that the next automatic stop time of the engine is the prescribed time or more if the last value of the vehicle stop time or the automatic stop time of the engine is a predetermined signal stop time or more.

The inventors analyzed a history of measurement values of the vehicle stop time or the automatic stop time of the engine and then found that, if the last values of the vehicle stop time or the automatic stop time of the engine is a vehicle stop time (signal stop time) that is expected on a stop of the vehicle at a traffic signal or more, a probability that the next automatic stop time of the engine becomes long is increased.

From this, it is predicted whether the next automatic stop time of the engine is short or long based on the above. This makes it possible to predict, with a high degree of accuracy, whether or not a situation where the engine is automatically stopped is a situation where the fuel saving benefit is degraded.

The prediction unit may predict whether or not the next automatic stop time of the engine is less than the prescribed time based on a plurality of the last values from the history of the vehicle stop time or from the history of the automatic stop time of the engine.

The inventors found out that it is possible to whether or not predict the next automatic stop time becomes short based on a plurality of the last values of the vehicle stop time or the automatic stop time of the engine. From this, it is predicted whether or not the next automatic stop time of the engine is less than the prescribed time based on the above plurality of the last values.

The prediction unit may predict that the next automatic stop time of the engine is the prescribed time or more if a half or more of the plurality of the last values from the history of the vehicle stop time or from the history of the automatic stop time of the engine is a predetermined short stop time is more.

The inventors found out that, if a half or more of the last values from the history of the vehicle stop time or the automatic stop time of the engine is the above predetermined short stop time is more, the probability that the next automatic stop time will be long is high. From this, in the above exemplary aspect, it is predicted whether or not the next automatic stop time of the engine is short based on the above.

The prediction unit may predict whether or not the next automatic stop time of the engine is less than the prescribed time based on a plurality of the last values from the history of the vehicle stop time or from the history of the automatic stop time of the engine.

The inventors found out that it is possible to predict whether or not the next automatic stop time of the engine is less than the prescribed time based on a plurality of the last values of the vehicle stop time or the automatic stop time of the engine. From this, in the above exemplary aspect, it is predicted whether or not the next automatic stop time of the engine becomes short based on the above.

The prediction unit may predict that the next automatic stop time of the engine is the prescribed time or more if a half or more of the plurality of the last values from the history of the vehicle stop time or from the history of the automatic stop time of the engine is a predetermined short stop time or more, the short time being less than the signal stop time.

The inventors found out that, if a half or more of the last values of the vehicle stop time or the automatic stop time of the engine is the above predetermined short stop time or more, a probability that the next automatic stop time becomes long is high. From this, in the above exemplary aspect, it is predicted whether or not the next automatic stop time of the engine becomes short based on the above.

The prediction unit may predict that the next automatic stop time of the engine is the prescribed time or more if the last value and the last value but one from the history of the vehicle stop time or from the history of the automatic stop time of the engine are a predetermined short stop time or more.

The inventors found out that, if the last value and the last value but one of the vehicle stop time or the automatic stop time of the engine are the above predetermined short stop time or more continuously, a probability that the next automatic stop time becomes long is high. From this, in the above exemplary aspect, it is predicted whether or not the next automatic stop time of the engine becomes short based on the above last value and the last value but one.

The prediction unit may predict that the next automatic stop time of the engine is the prescribed time or more if one or less of the last three values from the history of the vehicle stop time or from the history of the automatic stop time of the engine are less than a predetermined short stop time.

The inventors found out that, if one or less of the last three values of the vehicle stop time or the automatic stop time of the engine is less than the above predetermined short stop time, a probability that the next automatic stop time becomes long is high. From this, in the above exemplary aspect, it is predicted whether or not the next automatic stop time of the engine becomes short based on the above.

The prediction unit may predict that the next automatic stop time of the engine is less than the prescribed time if the last three values from the history of the vehicle stop time or from the history of the automatic stop time of the engine are less than a predetermined short stop time.

The inventors found out that, if the last three values of the vehicle stop time or the automatic stop time of the engine are less than the above predetermined short stop time, a probability that the next automatic stop time becomes short is high. From this, in the above exemplary aspect, it is predicted that the next automatic stop time of the engine becomes short based on that the above last three values are less than the above short stop time.

The prediction unit may predict that the next automatic stop time of the engine is the prescribed time or more, if two of the last three values from the history of the vehicle stop time or from the history of the automatic stop time of the engine are less than a predetermined short stop time and the other of the last three values is a predetermined signal stop time or more, the signal stop time being more than the short stop time.

The inventors found out that, if two of the last three values of the vehicle stop time or the automatic stop time of the engine are less than the above predetermined short stop time and the other of the last three values is the above predetermined signal stop time or more, a probability that the next automatic stop time becomes short is high. From this, in the above exemplary aspect, it is predicted that the next automatic stop time of the engine becomes short based on the above.

The prediction unit may predict that the next automatic stop time of the engine is less than the prescribed time, if two of the last three values from the history of the vehicle stop time or from the history of the automatic stop time of the engine are less than a predetermined short stop time and the last value but three is less than the short stop time.

The inventors found out that, if two of the last three values of the vehicle stop time or the automatic stop time of the engine are less than the above predetermined short stop time and the last value but three is less than the above short stop time, a probability that the next automatic stop time becomes short is high. From this, in the above exemplary aspect, it is predicted whether or not the next automatic stop time of the engine becomes short based on the above.

The control apparatus may further comprises a small-radius turn judgment unit that judges whether or not the vehicle turns in a small radius based on a detection value of a behavior of the vehicle detected by an on-board sensor mounted on the vehicle. The prediction unit may predict that the next automatic stop time of the engine is less than the prescribed time if the small-radius turn judgment unit judges that the vehicle turns in a small radius.

Under condition that the vehicle moves on an arterial road in, e.g., an urban or and suburban area, when the vehicle stops at a signal light at an intersection, there is a trend where the vehicle stop time or the automatic stop time of the engine becomes long usually. In contrast, under condition that the vehicle moves on a road without traffic lights such as a residential area or a country road (hereinafter referred to as "non-arterial road"), when the vehicle pauses due to, e.g., a stop sign at an intersection on the non-arterial road, or decelerates or crawls because of confirming safe road condition, there is a trend where the vehicle stop time or the automatic stop time of the engine becomes short usually. From this, it is possible to judge whether the vehicle drives on the arterial road or the non-arterial road based on the history of the vehicle stop time or the automatic stop time of the engine.

However, immediately after the vehicle enters the non-arterial road from the arterial road, it cannot be properly predicted whether or not the next automatic stop time of the engine becomes short based on the history of the vehicle stop time or of the automatic stop time of the engine.

Here, the inventors noticed that, when the vehicle enters the non-arterial road, the vehicle turns in a small radius. From this, if it is judged that the vehicle enters the non-arterial road, the vehicle turns in a small radius, it is judged that the vehicle enters the non-arterial road and then it is predicted that the next automatic stop time of the engine is less than the prescribed time. Due to this, even if the vehicle enters the non-arterial road from the arterial road, it is possible to reduce an occurrence of s situation where the engine is automatically stopped despite the automatic stop time becoming short.

The prediction unit may predict that the next automatic stop time of the engine is less than the prescribed time, if a running speed of the vehicle is a prescribed low speed or less and the small-radius turn judgment unit judges that the vehicle turns in a small radius.

Before the vehicle turns in a small radius to enter the non-arterial road from the arterial road, the vehicle usually decelerates. From this, in the above exemplary aspect, if it is judged that the running speed of the vehicle is the prescribed low speed or less and it is judged that the vehicle turns in a small radius, it is judged that the vehicle enters the non-arterial road and then it is predicted that the next automatic stop time of the engine is less than the prescribed time. This makes it possible to improve judgment accuracy of judging whether or not the vehicle enters the non-arterial road and to improve prediction accuracy of predicting whether or not the next automatic stop time is less than the prescribed time.

The prediction unit may predict that the next automatic stop time of the engine is less than the prescribed time, if a vehicle stop time or an automatic stop time of the engine, which is immediately after the small-radius turn judgment unit judges that the vehicle turns in a small radius, is less than a predetermined short stop time.

When the vehicle drives on the arterial road where the radius of curvature is small, it can be wrongly judged that the vehicle turns in a small radius to enter the non-arterial road from the arterial road. Here, after the vehicle enters the non-arterial road from the arterial road, when the vehicle stops in the non-arterial road, there is a trend where the automatic stop time of the engine becomes short.

From this, in the above exemplary aspect, it is predicted that the next automatic stop time of the engine is less than the prescribed time, if a vehicle stop time or an automatic stop time of the engine, which is immediately after it is judged that the vehicle turns in a small radius, is less than the predetermined short stop time. This makes it possible to improve judgment accuracy of judging whether or not the vehicle enters the non-arterial road and to properly improve prediction accuracy of predicting whether or not the next automatic stop time is less than the prescribed time.

The prediction unit may predict that the next automatic stop time of the engine is less than the prescribed time if a majority of a predetermined number of the last values from the history of the vehicle stop time or from the history of the automatic stop time of the engine is less than a predetermined short stop time, the predetermined number being three or more, and may continue to predict that the next automatic stop time of the engine is less than the prescribed time until the predetermined number of the last values of the vehicle stop time or the automatic stop time of the engine is newly obtained, if the vehicle stop time or the automatic stop time of the engine is less than the short stop time after the small 11-radius turn judgment unit judges that the vehicle turns in a small radius.

The inventors found out that, if a majority of a predetermined number of the last values of the vehicle stop time or the automatic stop time is less than the predetermined short stop time, the predetermined number being three or more, a probability that the next automatic stop time becomes short is high. From this, in the above exemplary aspect, it is predicted whether or not the next automatic stop time of the engine becomes short based on the above last three values.

When the above prediction technique is applied, after the vehicle enter the non-arterial road from the arterial road, until the predetermined number of the vehicle stop time or the automatic stop time is obtained, it can be not properly predicted whether or not the next automatic stop time of the engine becomes short.

Here, it is considered that a probability is high that a situation where the vehicle stop time or the automatic stop time becomes short after the vehicle turns in a small radius is a situation where the vehicle drives on the non-arterial road.

From this, in the above exemplary aspect, after the vehicle turns in a small radius, as long as it is judged that the vehicle stop time or the automatic stop time becomes less than the prescribed time, it is judged that a probability that the vehicle drives on the non-arterial road is high. This prediction of predicting that the next automatic stop time of the engine is less than the prescribed time continues until the predetermined number of the vehicle stop time or the automatic stop time is newly obtained. This makes it possible to reduce occurrence of a situation where the engine is automatically stopped during a period when it cannot be properly predicted that the next automatic stop time becomes short.

The prediction unit may predict that the next automatic stop time of the engine is less than the prescribed time if the last three values from the history of the vehicle stop time or from the history of the automatic stop time of the engine are less than a predetermined short stop time, and may continue to predict that the next automatic stop time of the engine is less than the prescribed time until the predetermined number of the last values of the vehicle stop time or the automatic stop time of the engine is newly obtained, if the vehicle stop time or the automatic stop time of the engine is less than the short stop time after the small-radius turn judgment unit judges that the vehicle turns in a small radius.

In the above exemplary aspect, it is possible to reduce occurrence of a situation where the engine is automatically stopped during a period when it cannot be properly predicted that the next automatic stop time becomes short, i.e., a period from when it is judged that a probability that the vehicle enters the non-arterial road is high to when new three values of the vehicle stop time or the automatic stop time are obtained.

The a small-radius turn judgment unit may judge whether or not the vehicle turns in a small radius based on at least one of a steering amount of a steering unit operated by a driver to steer a steered wheel of the vehicle and a difference between a rotational speed of an outer wheel and a rotational speed of an inner wheel.

In the above exemplary aspect, the use of a parameter concerning a turning of the vehicle makes it possible to properly judge whether or not the vehicle turns in a small radius.

The prediction unit may predict that the next automatic stop time of the engine is less than the prescribed time, if a direction indicator of the vehicle is operated and the small-radius turn judgment unit judges that the vehicle turns in a small radius.

When the vehicle turns in a small radius to enter the non-arterial road from the arterial road, the direction indicator is operated by a driver. From this, in the above exemplary aspect, if it is judged that the direction indicator is operated and it is judged that the vehicle turns in a small radius, it is judged that a probability that the vehicle enters the non-arterial road from the arterial road and then it is predicted that the next automatic stop time is less than the prescribed time. In the above exemplary aspect, it is possible to improve judgment accuracy of judging whether or not the vehicle enters the non-arterial road and to properly improve prediction accuracy of predicting whether or not the next automatic stop time is less than the prescribed time.

The prescribed speed may be a speed of more than zero.

In the above exemplary aspect, the engine is automatically stopped also when the vehicle is driven, and then the fuel saving benefit due to an idle stop control is further improved. In this case, the engine is easily automatically stopped under condition that the automatic stop time of the engine becomes short, and then a situation in which the fuel saving benefit of the engine is reduced occurs easily. Due to this, the above exemplary aspect including the above prediction unit and the prohibition unit have many advantages.

BRIEF DESCRIPTION OF THE DRAWINGS

In the accompanying drawings:

FIG. 3 is an explanatory diagram showing a fuel saving benefit due to an idle stop control according to the first exemplary embodiment;

FIGS. 4A and 4B are a timing chart showing an example of an idle stop control in non-arterial road according to the first exemplary embodiment;

FIG. 18 is a diagram showing an example of a stop time prediction process and an automatic stop prohibition process according to the second exemplary embodiment;

FIG. 22 is a diagram showing a correlation between the steering amount and a wheel speed difference according to the other exemplary embodiment of the present invention;

FIG. 23 is a diagram showing results of measurement of the steering amount and the wheel speed difference according to the other exemplary embodiment.

DETAILED DESCRIPTION OF PREFERRED EMBODIMENTS (First Embodiment)

Hereinafter, referring to the accompanying drawings, a control apparatus, which is according to a first exemplary embodiment of the present invention and is applied to an on-vehicle engine system, will now be described.

Figure 1:
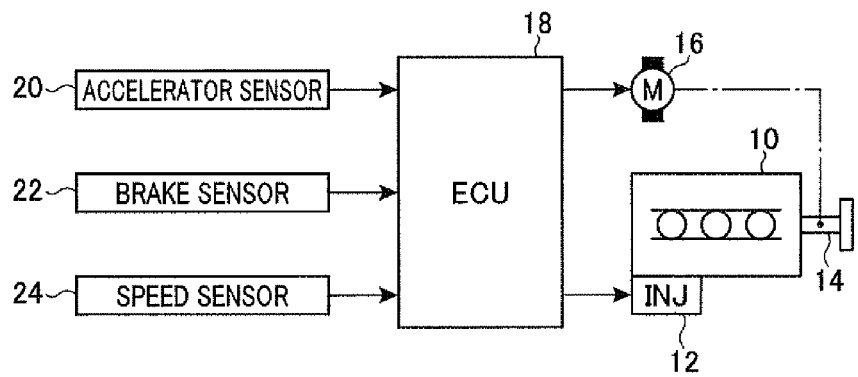
FIG. 1 is a block diagram showing a system configuration of an on-vehicle engine system provided with a control apparatus for automatic stop of an engine according to a first exemplary embodiment of the present invention.

FIG. 1 shows a configuration of the on-vehicle engine system according to the present embodiment.

As shown in FIG. 1, the system is provided with an engine 10 mounted on a vehicle. The engine 10 has a plurality of cylinders, each comprising an electronically controlled fuel injection valve 12 that supplies and injects fuel into a combustion chamber of the engine 10. Energy is generated by combustion of the fuel injected by the injection valve 12, and then is extracted as a rotational force of an output shaft (i.e., a crankshaft 14) of the engine 10.

The crankshaft 14 is coupled to a starter 16. An ignition switch (not shown) is turned on to start the starter 16, and then the starter 16 gives initial rotation to the crankshaft 14 to start the engine 10 (cranking is performed).

An electronic control unit (hereinafter referred to "ECU 18", which corresponds to a control apparatus according to the present embodiment) is mainly composed of the microcomputer including a well-known CPU (central processing unit), ROM (read only memory) and RAM (random access memory). The ECU 18 inputs signals detected by various sensors, e.g., an accelerator sensor 20, a brake sensor 21, and a speed sensor 24. The accelerator sensor 20 detects an accelerator pedal depression value (accelerator operation value). The braking sensor 21 detects a brake pedal depression value (brake operation value). The speed sensor 24 detects a running speed of the vehicle. The ECU 18 executes various control programs stored in the ROM based on the above input to perform processes including a fuel injection control for the fuel injection valve 12 and a drive control process for the starter 16.

Particularly, the ECU 18 executes an idle stop control for the engine 10. The idle stop control is executed to stop a fuel injection of the fuel injection valve 12, etc. so as to automatically stop the engine if a predetermined stop condition is satisfied during operation of the engine 10 and subsequently to start a drive of the starter 16 and a fuel injection of the fuel injection valve 12, etc. so as to automatically restart the engine if a predetermined restart condition is satisfied. In the embodiment, the stop condition may be a condition that a logical product of the following conditions is true. The conditions include a condition that a brake operation is performed and a condition that a running speed of the vehicle is a prescribed speed (e.g., 7-20 km/h) or less. The prescribed speed may be more than zero. The restart condition may be a condition that the brake operation is not performed.

For example, the ECU 18 may judge whether or not the brake operation is performed based on whether or not a brake operation value corresponding to an output value of the braking sensor 22 is more than zero. The ECU 18 may calculate the running speed of the vehicle based on an output value of the speed sensor 24.

Of the above stop condition, the condition concerning the running speed of the vehicle is a condition that is set so as to improve the fuel saving benefit due to the idle stop control. Hereinafter, referring to FIG. 2, the idle stop control according to the present embodiment (hereinafter referred to as "IS control on deceleration") will be described.

Figure 2:
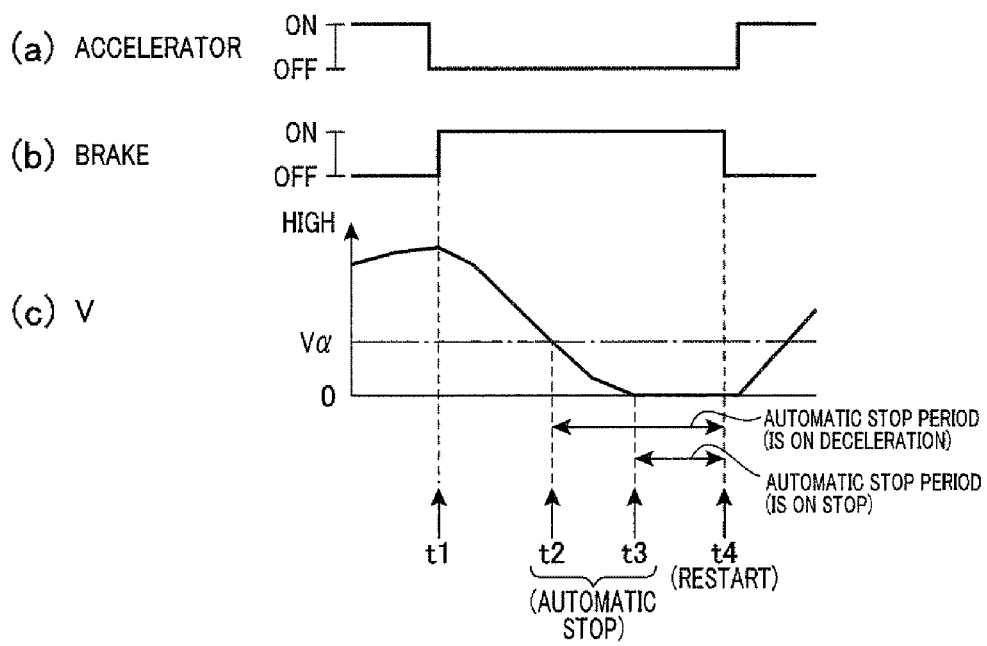
FIG. 2 is a timing chart showing an overview of an idle stop (IS) control on deceleration in according to the first exemplary embodiment.

FIG. 2 show an example of the IS control on deceleration according to the present embodiment. In FIG. 2, (a) shows a change in accelerator operation, (b) shows a change in brake operation, and (c) shows a change in the running speed V of the vehicle. In each of the changes in (a) and (b) of FIG. 2, "ON" shows when each of the accelerator operation value corresponding to the output value of the accelerator sensor 20 and the brake operation value is more than zero and "OFF" shows when each of the above operation values is zero. Each of the changes in (a)-(c) of FIG. 2 shows a situation in which, when the vehicle moves on an arterial road, the vehicle stops at traffic lights in an intersection and subsequently starts to move again.

As shown in FIG. 2, the brake operation is started at time t1, and then the running speed V of the vehicle starts to decrease. Subsequently, the running speed V of the vehicle comes to the above prescribed speed Vα or less at time t2, and then the engine 10 is automatically stopped. After this, the brake operation is released at time t4 so as to drive the vehicle, and then the engine 10 is restarted. In contrast, when an idle stop control that automatically stops the engine 10 after a stop of the vehicle (hereinafter referred to as "IS control on vehicle stop") is applied, the vehicle stops at time t3, and then the engine 10 is automatically stopped. Therefore, an automatic stop period (from time t2 to t4) of the IS control on deceleration is longer than an automatic stop period (from time t3 to t4) of the IS control on vehicle stop. This makes it possible to improve the fuel saving benefit of the engine 10.

If the automatic stop time is short, the fuel saving benefit of the engine 10 may be degraded. Hereinafter, referring to FIG. 3, the effect of the automatic stop period on the fuel saving benefit will be described.

FIG. 3 shows an example of a change in, e.g., the fuel saving benefit of the engine 10 on the idle stop control. In FIG. 3, (a) shows a change in speed of rotation of the crankshaft 14 (engine speed NE), (b) shows a change in a fuel injection amount Q from the fuel injection valve 12, and (c) shows a change in an amount of fuel consumption that is converted from power consumption of the starter 16.

In the example shown in FIG. 3, the engine 10 is automatically stopped during the period from time t1 to t2. If the vehicle is moving on the arterial road in, e.g., an urban and suburban areas, when the vehicle stops at a signal light at an intersection, a reduction amount QA of the fuel injection amount Q during the automatic stop period of the engine 10 becomes more than an additional value of an converted fuel consumption amount QC that is converted from power consumption of the starter 16 and an on-start increment amount QB that is an increment amount of the fuel injection amount Q needed to improve starting performance of the engine 10 on a start of the engine 10. From this, if the automatic stop period of the engine 10 is set to not less than such a prescribed period that the reduction amount QA of the fuel injection amount is more than the additional value of the on-start increment amount QB and the converted fuel consumption amount QC (in other words, a lower limit of a period that can achieve the fuel saving benefit due to the automatic stop of the engine 10), the fuel saving benefit due to the automatic stop of the engine 10 can be achieved. In the example, the on-start increment amount QB may be an amount of fuel consumption of the engine 10 when the engine 10 is operated in an idle drive condition during four seconds, the converted fuel consumption amount QC may be an amount of fuel consumption of the engine 10 when the engine 10 is operated in an idle drive condition during one second, and the above prescribed period, therefore, may be five seconds.

In contrast, under condition that the vehicle moves on a road without traffic lights such as a residential area or a country road (hereinafter referred to as "non-arterial road"), when the vehicle pauses due to, e.g., a stop sign at an intersection on the non-arterial road, or decelerates or crawls because of confirming safe condition, a stop or a deceleration without a stop during a short period of less than two seconds (hereinafter referred to as "short stop") is usually repeated. In this case, the automatic stop period becomes short, and then the reduction amount QA of the fuel injection amount Q is less than the additional value of the on-start increment amount QB and the converted fuel consumption amount QC. This cannot result in the fuel saving benefit of the engine 10.

In particular, compared to the vehicle with the IS control on vehicle stop, the vehicle with the IS control on deceleration may more frequently encounter a situation where the automatic stop period becomes short due to an increase in frequency of occurrence of the short stop in the non-arterial road. Hereinafter, referring to FIGS. 4A, 4B, 5A and 5B, this will be described.

FIGS. 4A and 4B show an example of an idle stop control when the vehicle pauses on the non-arterial road. In FIG. 4A, (a-1), (b-1), and (c-1) correspond to (a), (b), and (c) of FIG. 2, respectively and, in FIG. 4B, (a-2), (b-2), and (c-2) correspond to (a), (b), and (c) of FIG. 2, respectively.

In the vehicle that performs the IS control on vehicle stop, if the vehicle does not stop, the stop condition of the engine 10 is not satisfied. Due to this, as shown in FIG. 4A, for example, the brake operation is released at a timing (time t1) before the engine 10 is automatically stopped at a stop period (from time t2 to t3). This occurs more often in the vehicle with the IS control on vehicle stop. Accordingly, this vehicle does not so frequently experience a situation where the automatic stop period of the engine 10 becomes a short time.

In contrast, in the vehicle that performs the IS control on deceleration, a stop condition is satisfied prior to a stop of the vehicle. This can broaden a scope of a running speed of the vehicle that can automatically stop the engine 10 to increase a chance to satisfy the restart condition prior to a stop of the vehicle after an automatic stop of the engine 10. Due to this, as shown in FIG. 4B, after the engine 10 is automatically stopped, for example, the brake operation is released at time t2 or t3 prior to time t4 at which the vehicle stops and then the engine 10 is restated. Accordingly, this vehicle more frequently encounters a situation where the automatic stop period of the engine 10 becomes a short time.

Figure 5A:
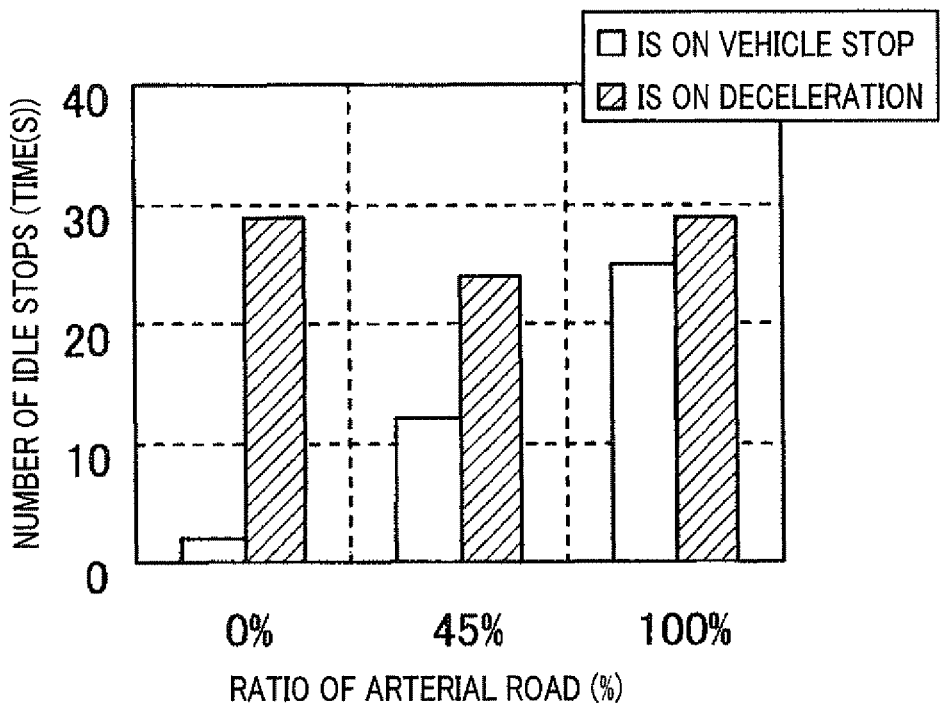
FIGS. 5A and 5B are a diagram showing measuring results such as the number of idle stops according to the first exemplary embodiment.
Figure 5B:
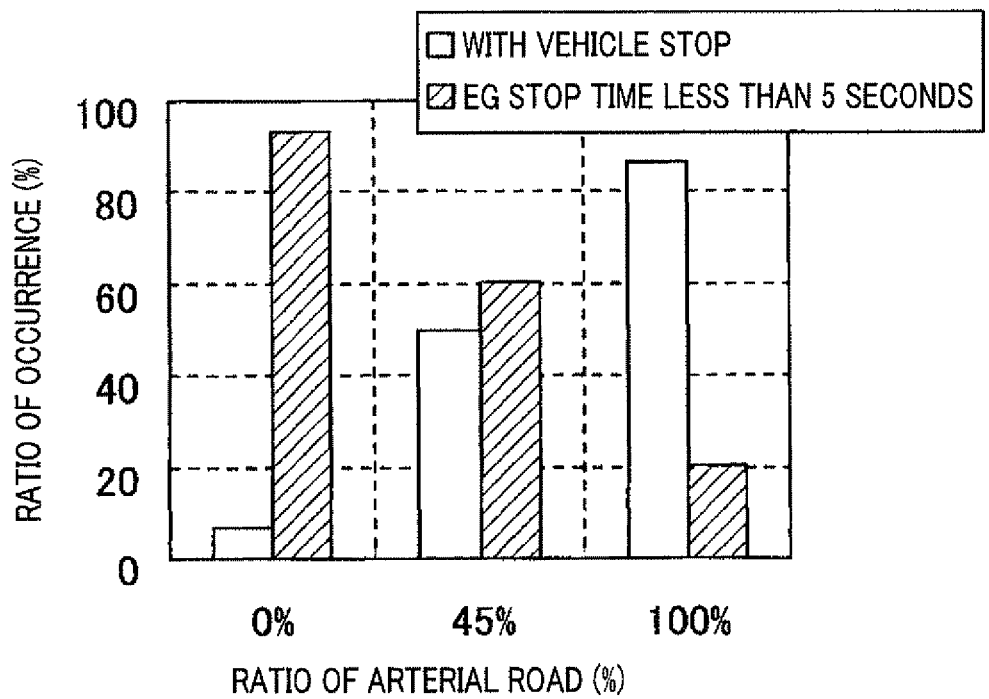

FIGS. 5A and 5B show measuring results of e.g., the number of automatic stops (the number of idle stops). FIG. 5A shows measuring results of the number of idle stops in each of the IS control on deceleration and the IS control on vehicle stop when the vehicle drives along a predetermined running route where an arterial road and a non-arterial road are located in a mixed manner. FIG. 5B shows a ratio of occurrence of idle stops with a stop of the vehicle to a total of the number of idle stops and a ratio of occurrence of idle stops with an automatic stop time less than five seconds to a total of the number of idle stops. In FIGS. 5A and 5B, a ratio of arterial roads is a ratio of a running distance in the arterial roads to a distance in the predetermined running route (i.e., an additional value of a running distance in the arterial and non-arterial roads).

As shown in FIG. 5A, when the IS control on deceleration is applied, the lower the ratio of arterial roads becomes, the more the degree of an increase in the number of idle stops with respect to the IS control on stop becomes. This is because, as shown in FIG. 5B, the lower the ratio of arterial roads becomes, the more the number of idle stops without a stop of the vehicle becomes. As shown in FIG. 5B, the lower the ratio of arterial roads becomes, the more the number of idle stops during such a short time that an automatic stop time of the engine 10 is less than five seconds becomes. This reduces the fuel saving benefit of the engine 10.

In order to solve these problems, the inventors measured a vehicle stop time when the vehicle drives along a predetermined running route where arterial and non-arterial roads are located in a mixed manner and, after analyzing the stop time measured in detail, found out that it is possible to predict the next vehicle stop time based on a history of the stop time. In summary, it is possible to predict whether or not the vehicle stop time becomes short next time when the engine 10 is automatically stopped, based on the history of the stop time.

As a result, the present embodiment performs a stop time prediction process to predict whether or not the next automatic stop time of the engine 10 is less than the prescribed time and, if it is predicted that the next automatic stop time of the engine is less than the prescribed time, performs an automatic prohibition process to prohibit the next automatic stop of the engine. This makes it possible to reduce degradation of the fuel saving benefit of the engine 10. Hereinafter, referring to FIGS. 6-11, the stop time prediction process and the automatic prohibition process will be described in detail.

Figure 6:
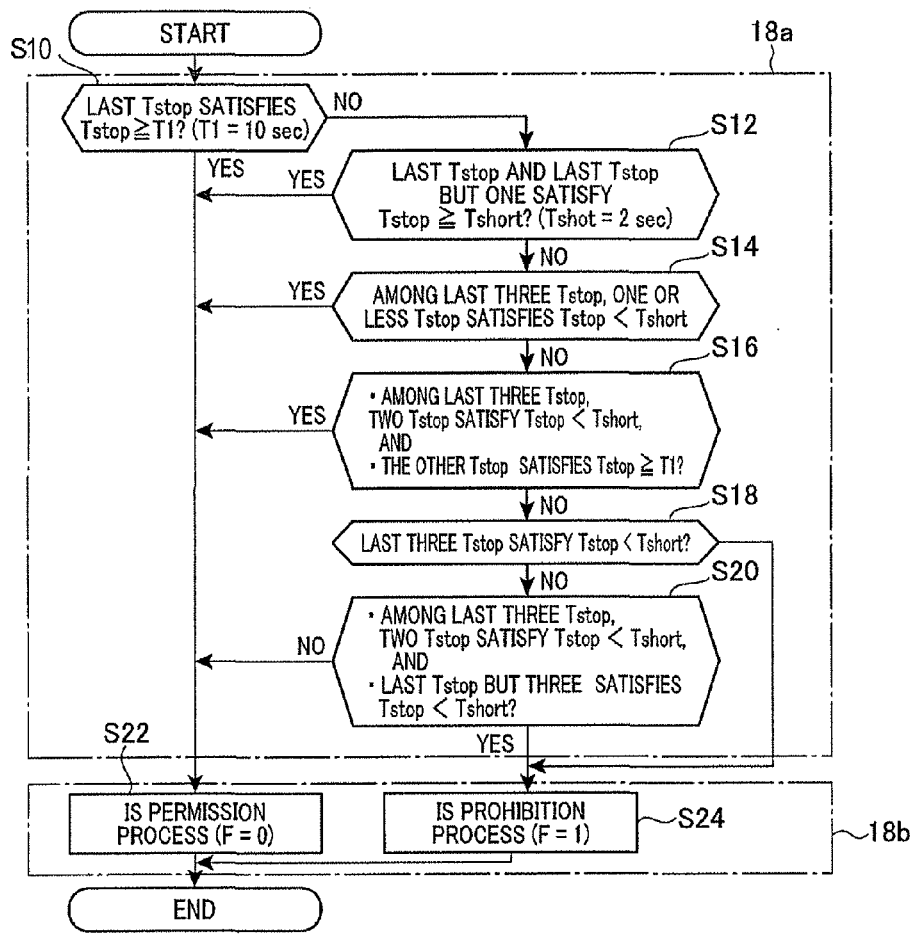
FIG. 6 is a flowchart showing steps of a stop time prediction process and an automatic stop prohibition process according to the first exemplary embodiment.

FIG. 6 shows the steps of the stop time prediction process and the automatic prohibition process according to the present embodiment. These processes are repeatedly executed at, for example, a predetermined cycle by the ECU 18. In the present embodiment, the vehicle stop time is calculated every stop of the vehicle and then is stored in a memory of the ECU 18. In FIG. 6, the ECU 18 functionally includes a prediction unit 18a that performs processes of the following steps S10-S20 and a prohibition unit 18b that performs the following processes of the following steps S22 and S24. The prediction unit 18a and prohibition unit 18b correspond to a prediction unit and a prohibition unit included in a control apparatus according to the present embodiment.

In the series of processes, at steps S10-S20, the ECU 18 predicts whether or not the next automatic stop time of the engine 10 is a prescribed time or more, i.e., whether or not a fuel saving benefit due to an automatic stop of the engine 10 is obtained. First, at step S10, the ECU 18 judges whether or not the last stop time Tstop is a signal stop time T1 (e.g., 10 seconds) or more. The signal stop time T1 is a stop time that is assumed on a stop of the vehicle at a traffic signal at e.g., an intersection in the arterial road, and is more than the above prescribed time (e.g., five seconds). This process is based on the following. If the last vehicle stop time is the signal stop time T1 or more, the following probability becomes high. This probability is that the next automatic stop time of the engine 10 becomes long. Therefore, this process is designed to predict whether or not the next automatic stop time is the prescribed time or more based on the last vehicle stop time.

Hereinafter, referring to FIG. 7, an example of a technique for this prediction will be described.

Figure 7A:
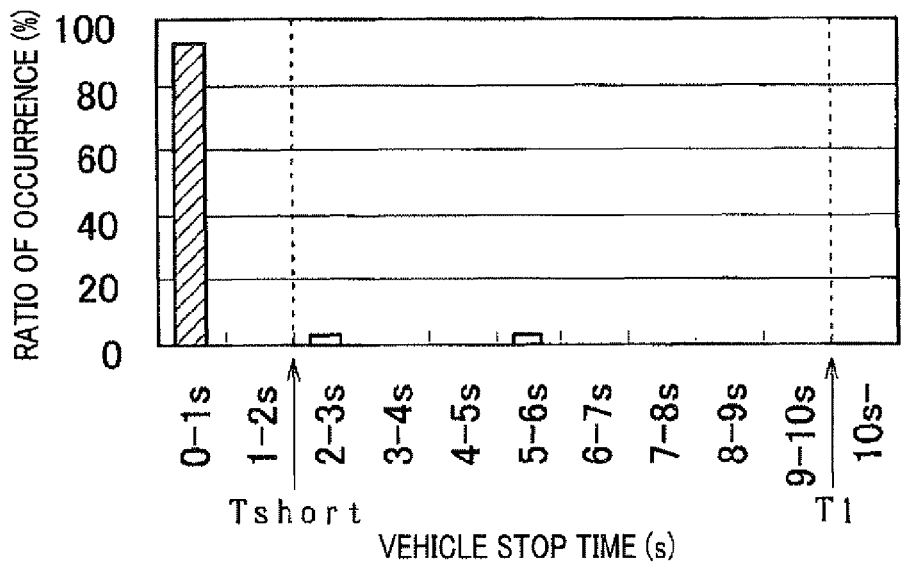
FIGS. 7A and 7B are a diagram showing a frequency distribution of a vehicle stop time in a non-arterial road and an arterial road according to the first exemplary embodiment.
Figure 7B:
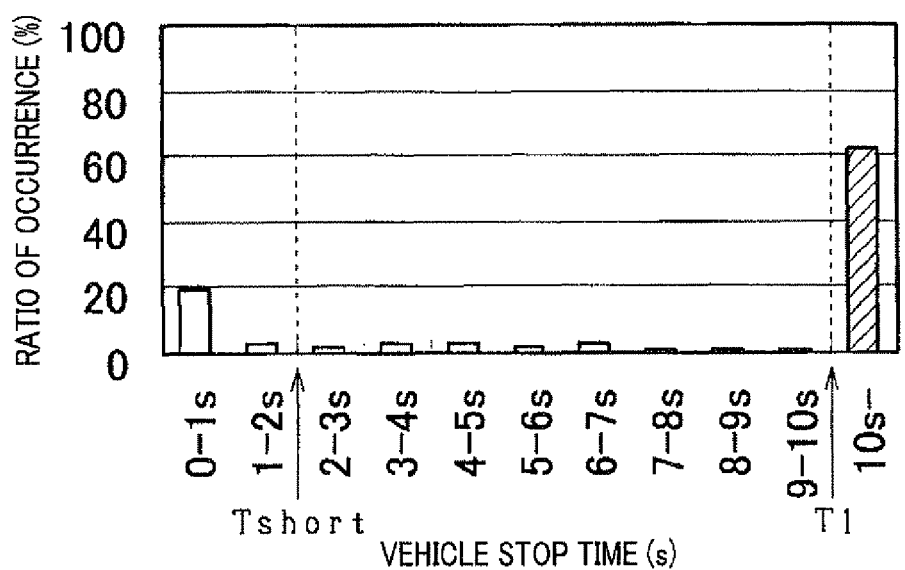

FIGS. 7A and 7B show, as a frequency distribution, a vehicle stop time that is measured when the vehicle drives along a predetermined running route where an arterial road and a non-arterial road are located in a mixed manner, and is divided into the arterial road and the non-arterial road. FIG. 7A shows the frequency distribution of the vehicle stop time in the non-arterial road, and FIG. 7B shows the frequency distribution of the vehicle stop time in the arterial road.

When driving on the arterial road, the vehicle repeats the short stop. Due to this, FIG. 7A shows that most of vehicle stop time in the non-arterial road is less than the prescribed time and is less than a predetermined short stop time Tshort (e.g., two seconds), and the vehicle stop time is not the signal stop time T1 of 10 seconds or more.

In contrast, FIG. 7B shows that most of vehicle stop time in the arterial road is the signal stop time T1 of 10 seconds or more, which does not occur in non-arterial roads. From this, if the last vehicle stop time is the signal stop time T1 or more, a probability that the vehicle drives on the arterial road is high and a probability that the next vehicle stop time becomes long is high. Due to this, if it is judged that the last vehicle stop time Tstop is the signal stop time T1, it is possible to predict that the next automatic stop time of the engine 10 is the prescribed time or more.

Referring again to FIG. 6, if the ECU 18 judges that the last vehicle stop time Tstop is less than the signal stop time T1 at step S10 (NO), the ECU 18 proceeds to step S12 and judges whether or not the last vehicle stop time Tstop and the last vehicle stop time but one Tstop are the short stop time Tshort or more. This process is based on the following. If the last vehicle stop time Tstop is less than the signal stop time T1, it is impossible to predict, with a high degree of accuracy, whether a road on which the vehicle moves is the arterial road or the non-arterial road based on only the last vehicle stop time. That is, as shown in FIG. 7A, there is an occasional occurrence of a vehicle stop in which the vehicle stop time in the non-arterial road is the short stop time Tshort or more. This is caused by, e.g., waiting for a traffic vehicle at an intersection in the non-arterial road to pass. In addition, as shown FIG. 7B, a short stop occurs in the arterial road, and a stop with the vehicle stop time that overlaps with the vehicle stop time occurs in the arterial road. These are caused by, e.g., stopping the vehicle at a traffic signal immediately before a timing when a traffic signal is turned from a signal for enabling the vehicle to stop to a signal for enabling the vehicle to run, decelerating the vehicle when the vehicle is turned right or left at an intersection, or decelerating the vehicle to adjust a distance from a vehicle in front.

Figure 8:
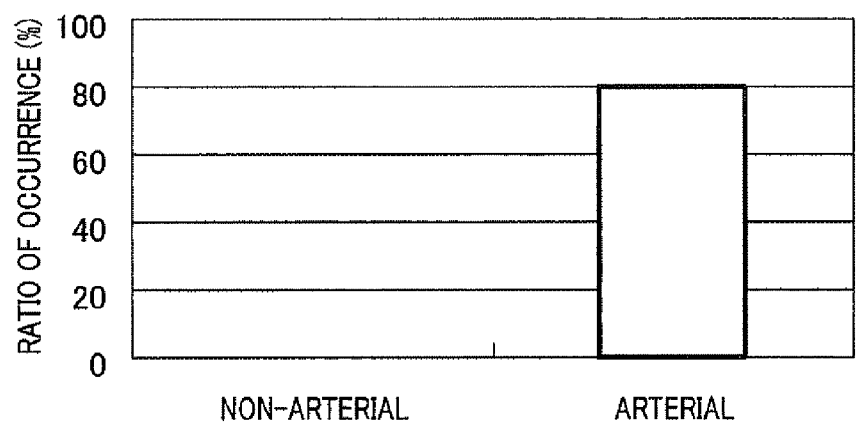
FIG. 8 is a diagram showing a frequency distribution in each vehicle stop pattern according to the first exemplary embodiment.

Here, after analyzing a history of measured values of a vehicle stop time in detail, the inventors found out that, as shown in FIG. 8, with respect to the last vehicle stop time and the last vehicle stop time but one that are continuously the short stop time Tshort or more, a ratio of the next automatic stop time of the engine 10 that is a prescribed time of five second or more is approximately 80%. In this case, the following probability becomes high. This probability is that a situation in which the engine 10 is next automatically stopped corresponds to a situation in which the vehicle stops at a traffic signal on the arterial road. Due to this, even if the last vehicle stop time is less than the signal stop time T1, it is possible to predict, with a high degree of accuracy, whether or not the next automatic stop time of the engine 10 is the prescribed time or more based on the last vehicle stop time and the last vehicle stop time but one.

Referring again to FIG. 6, if the ECU 18 judges that at least one short stop occurs in the last vehicle stop and the last vehicle stop but one at step S12 (NO), the ECU 18 performs processes of steps S14-S18 because it is impossible to predict the next next automatic stop time of the engine 10 based on the last vehicle stop time and the last vehicle stop time but one. At steps S14-S18, the ECU 18 judges whether or not the next automatic stop time of the engine 10 is the prescribed time is more based on the last three values of the vehicle stop time.

Specifically, at step S14, the ECU 18 judges whether or not one or less of the last three values of the vehicle stop time is less than the short stop time Tshort, i.e., whether or not the number of occurrence of the short stop among the latest three vehicle stops is one or less. Hereinafter, referring to FIG. 9, an example of a technique for this prediction will be described.

Figure 9:
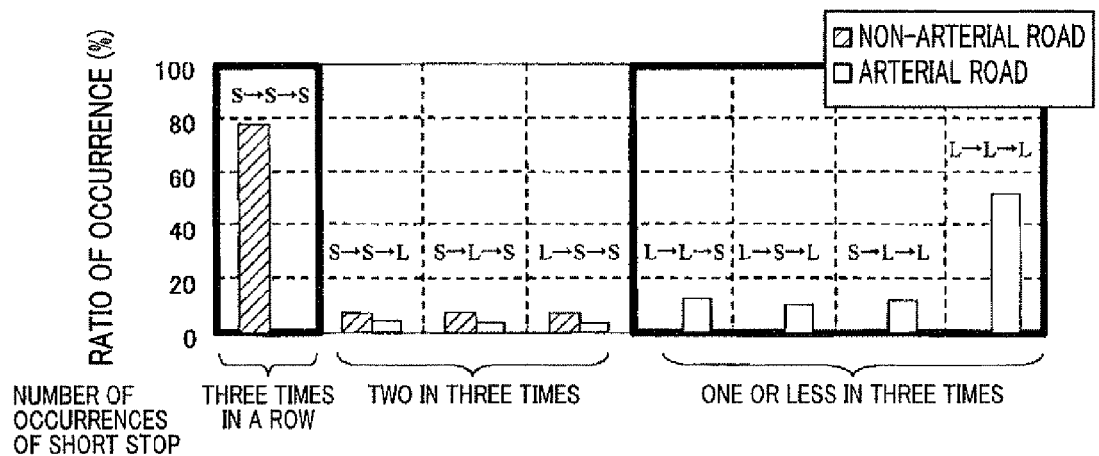
FIG. 9 is a diagram showing frequency distribution of each vehicle stop pattern according to the first exemplary embodiment.

FIG. 9 shows a frequency distribution of the last three vehicle stop patterns, i.e., each frequency distribution of the vehicle stop patterns in the arterial road and the non-arterial road. In FIG. 9, "S" shows that a short stop occurs, and "L" shows that a long stop occurs. In addition, for example, "S→L→L" represents that, after one short stop occurs, two long stops continuously occur.

As shown in FIG. 9, the vehicle stop pattern in which the short stop is one or less occurs in only the arterial road. From this, in the case of such a vehicle stop pattern, a probability that there is a situation where the vehicle stops at an intersection in the arterial road becomes high. Therefore, based on that the short stop is one or less, it is possible to predict, with a high degree of accuracy, that the next automatic stop time of the engine 10 is the prescribed time or more.

Figure 10:
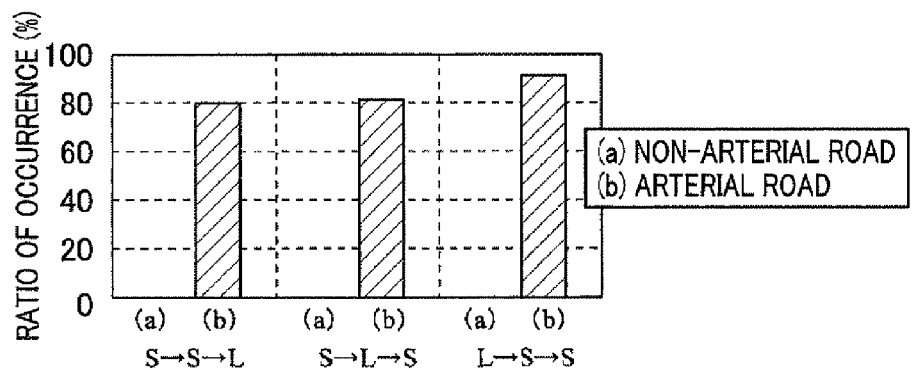
FIG. 10 is a diagram showing frequency distribution of each vehicle stop pattern according to the first exemplary embodiment.

Referring again to FIG. 6, if the ECU 18 judges that two or more short stops of the last three stops occur at step S14 (NO), the ECU 18 proceeds to step S16 and judges whether or not two of the last three values of the vehicle stop time Tstop is less than the short stop time Tshort and the other of the last three values is the signal stop time T1 or more. This is based on the following knowledge. According to whether or not a long stop time among the last three vehicle stops is the signal stop time T1 or more, it is possible to secure the prescribed time or more for the next automatic stop of the engine 10. FIG. 10 shows each frequency distribution in the arterial road and the non-arterial road when the long stop time of the last three vehicle stops is the signal stop time T1 or more. According to the results, if the long stop time of the latest three vehicle stops is the signal stop time T1 or more, the following probability becomes high. This probability is that the next automatic stop time of the engine 10 is the prescribed time or more. Therefore, a vehicle stop pattern, in which two of the last three vehicle stops are the short stop, occurs in both of the arterial road and the non-arterial road (see FIG. 9), and then, depending on the short stop or the long stop, the above prediction cannot be performed with a high degree of accuracy, but in the above patterns, a use of the last three values of the vehicle stop time makes it possible to perform the above prediction with a high degree of accuracy.

Referring again to FIG. 6, if the ECU 18 judges NO at step S16, the ECU 18 proceeds to step S18 and judges whether or not the last three values of the vehicle stop time Tstop are continuously less than the short stop time Tshort. This is based on the following. As shown in FIG. 9, in only the non-arterial road, the last three vehicle stops are short stops, and therefore, a probability that the short stop will be repeated becomes high.

Figure 11A:
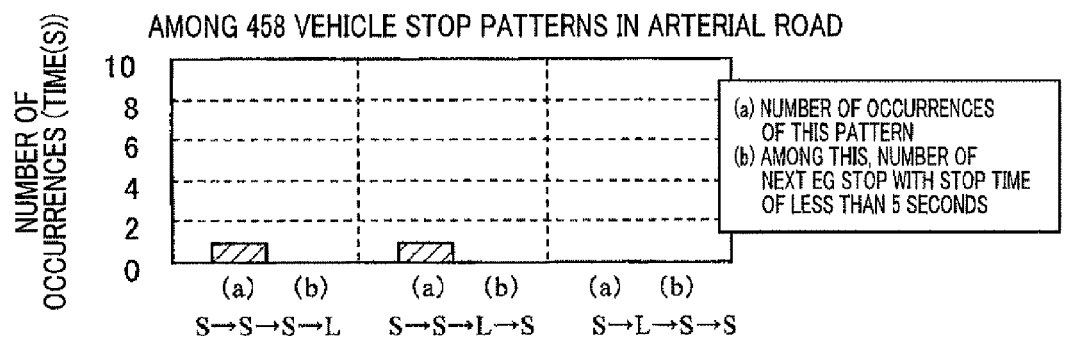
FIGS. 11A and 11B are a diagram showing frequency distribution of each vehicle stop pattern according to the first exemplary embodiment.

If the ECU 18 judges NO at step S18, the ECU 18 proceeds to step S20 and judges whether or not two of the last three values of the vehicle stop time Tstop are less than the short stop time Tshort and the last vehicle stop time Tstop but three (i.e., Tstop of a vehicle stop immediately before the last three vehicle stops) is less than the short stop time Tshort. This process is a prediction technique for predicting the next automatic stop time when it is impossible to predict the next automatic stop time based on the last three values of the vehicle stop time. This prediction technique will be described. As shown in FIG. 11A, among a total of 458 vehicle stop patterns regarding the last four values measured when the vehicle drives along the above predetermined running route, the number of occurrences of a situation in which the last vehicle stop but three in the arterial road becomes a short stop is one or zero. This means that, among the last four vehicle stops, a long stop occurs by chance. Therefore, if the last vehicle stop but three is a short stop, a probability that the vehicle drives on the non-arterial road becomes high.

Figure 11B:
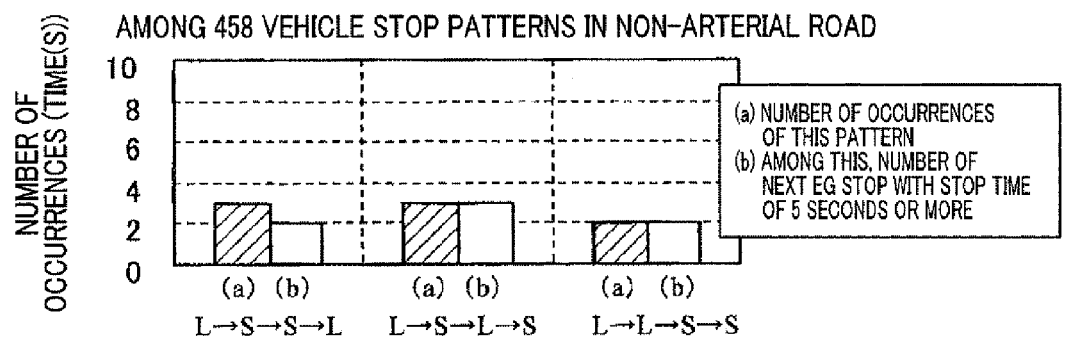

In contrast, as shown in FIG. 11B, among the above total of 458 vehicle stop patterns regarding the last four values, the number of occurrences of a situation in which the last vehicle stop but three in the arterial road becomes a short stop is small, i.e., two or three, but a ratio of the next automatic stop time of the engine 10 of the prescribed time or more is high. Due to this, if, among the last four vehicle stops, the last vehicle stop but three is a long stop, a probability that the vehicle drives on the arterial road becomes high. In view of this, if the ECU 18 judges NO at step S20, the ECU 18 can predict that the next automatic vehicle stop time is the prescribed time or more, and, if the ECU 18 judges YES at step S20, the ECU 18 can predict that the next automatic vehicle stop time is less than the prescribed time.

Referring again to FIG. 6, if the ECU 18 judges that the last vehicle stop time Tstop is the signal stop time T1 or more at step S10 or judges YES at step S12, S14 or S16, the ECU 18 judges that the automatic stop of the engine 10 can obtain the fuel saving benefit and then sets a value of an idle stop flag F to "0" to perform the IS permission process at step S22. Here, the value of the idle stop flag F is "0" or "1", where "0" represents that the automatic stop of the engine 10 is permitted, and "1" represents that the automatic stop of the engine 10 is prohibited. This value of the idle stop flag F is stored in a nonvolatile memory such as an EEPROM (electrically erasable and programmable read only memory) of the ECU 18.

In contrast, if the ECU 18 judges YES at step S18 or S20, the ECU 18 judges that the automatic stop of the engine 10 reduce the fuel saving benefit and then sets a value of an idle stop flag F to "1" to perform the IS prohibition process at step S24. As a result, even if the stop condition of the engine 10 is satisfied, the automatic stop of the engine 10 is prohibited.

If the process of step S22 or S24 is completed, the series of processes is temporarily ended.

Figure 12A:
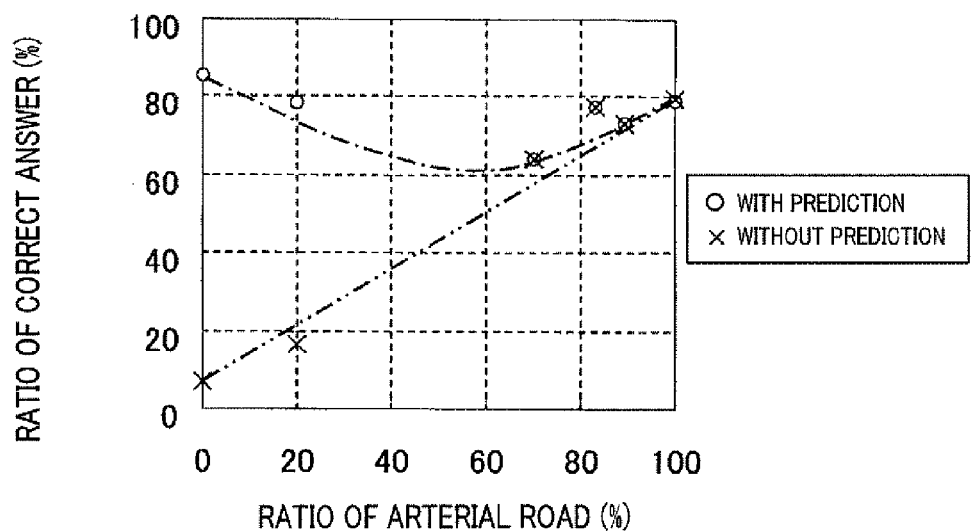
FIGS. 12A and 12B are a diagram showing effects of a stop time prediction process and an automatic stop prohibition process according to the first exemplary embodiment.
Figure 12B:
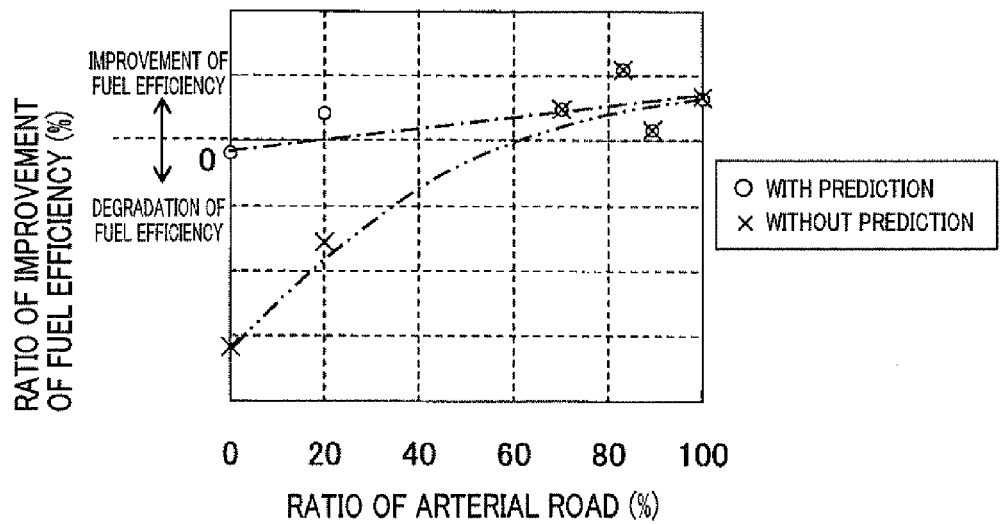

FIGS. 12A and 12B show examination results obtained by examining various effects when the above stop time prediction process and automatic stop prohibition process are applied to the IS control on deceleration. Specifically, FIG. 12A shows a relation between a ratio of correct answer and a ratio of arterial road. The ratio of correct answer corresponds to a ratio of the number of idle stops in which the vehicle stop time is the prescribed time (e.g., five seconds) or above to all the number of idle stops in the above predetermined running route. FIG. 12B shows a relation between a ratio of improvement of fuel efficiency and a ratio of arterial road. The ratio of improvement of fuel efficiency corresponds to a fuel consumption amount of the IS control on deceleration with reference to a fuel consumption amount of the IS control on vehicle stop when the vehicle drives along the above predetermined running route. In FIGS. 12A and 12B, "○" represents the examination results with the above stop time prediction process and automatic stop prohibition process, and "×" represents the examination results without these processes.

As shown in FIG. 12A, when the above stop time prediction process and automatic stop prohibition process are not performed, if the ratio of arterial road is low, the ratio of correct answer becomes low due to increase in the short stop. With this, as shown in FIG. 12B, if the ratio of arterial road is low, the ratio of improvement of fuel efficiency becomes low.

In contrast, when the above stop time prediction process and automatic stop prohibition process are performed, while the ratio of correct answer maintains high level in an area where the ratio of arterial road is high, it is possible to reduce a decrease in the ratio of correct answer in an area where the ratio of arterial road is low. Therefore, while the ratio of improvement of fuel efficiency is maintained in an area where the ratio of arterial road is high, it is possible to reduce an excessive decrease in the ratio of improvement of fuel efficiency in an area where the ratio of arterial road is low.

Figure 13A:
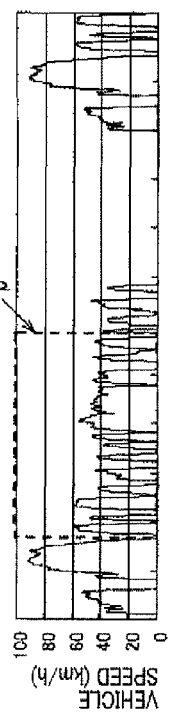
FIGS. 13A and 13B are a timing chart showing results of a survey on effects of the fuel saving benefit according to the first exemplary embodiment.
Figure 13B:
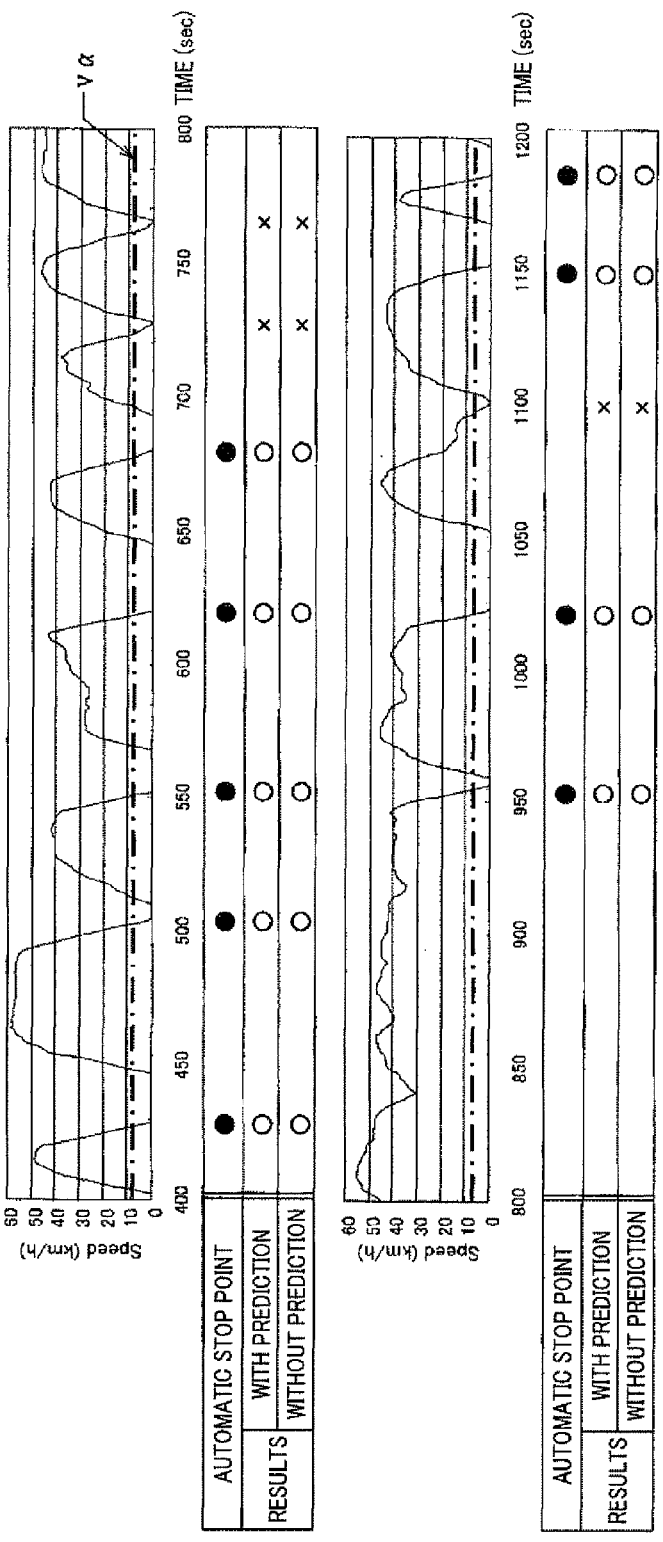

The above results shown in FIGS. 12A and 12B are obtained by the examination using the public road. In contrast, FIGS. 13A and 13B shows examination results obtained by examining various effects on the fuel saving benefit in a predetermined running mode (e.g., NEDC mode, JC08 mode, or LA#4 mode) when the above stop time prediction process and automatic stop prohibition process are applied to the IS control on deceleration. Specifically, FIGS. 13A and 13B shows examination results obtained by the examination using LA#4 mode. FIG. 13A shows a change in a running speed of the vehicle in LA#4 mode, and FIG. 13B shows a change in a β portion shown in FIG. 13A.

In FIG. 13B, "●" represents a first portion where the engine 10 should be automatically stopped because the fuel saving benefit can be obtained, "○" represents a second portion (correct judgment) where, in practice, the engine 10 can automatically stop in the first portion, and "×" represents a third portion (wrong judgment) where the engine 10 is automatically stopped in a fourth portion where the engine 10 should not be automatically stopped because the fuel saving benefit can be obtained. From these results, regardless of the presence or absence of the stop time prediction process, etc., there is no change in a portion where the engine 10 is automatically stopped, and then, effects on the fuel saving benefit in LA#4 mode, which is induced by the stop time prediction process and automatic stop prohibition process, are very small.

According to the present embodiment, the stop time prediction process and automatic stop prohibition process are performed, and then, it is possible to properly reduce degradation of the fuel saving benefit.

In the present embodiment described in detail above, the following effects are obtained.

(1) If it is judged that the last vehicle stop time Tstop is the signal stop time T1 or more, the stop time prediction process is performed to predict that the next automatic stop time of the engine 10 is the prescribed time or more is performed. This makes it possible to predict, with a high degree of accuracy, whether or not a situation in which next time the engine 10 is automatically stopped is a situation in which the fuel saving benefit is reduced due to the automatic stop of the engine 10.

(2) As the stop time prediction process, if it is judged that the last vehicle stop time and the last vehicle stop time but one are the short stop time Tshort or more, the process is performed to predict that the next automatic stop time of the engine 10 is the prescribed time or more. This makes it possible to predict, with a high degree of accuracy, whether or not the next automatic stop time of the engine 10 is less than the prescribed time.

(3) As the stop time prediction process, if it is judged that the last three values of the vehicle stop time are less than the short stop time Tshort, the process is performed to predict that the next automatic stop time of the engine 10 is less than the prescribed time. This makes it possible to predict, with a high degree of accuracy, whether or not the next automatic stop time of the engine 10 becomes short.

(4) If the stop time prediction process is performed to predict that the next automatic stop time is less than the prescribed time, the automatic stop prohibition process is performed to prohibit the next automatic stop of the engine 10. This makes it possible to reduce occurrence of a situation in which the engine 10 is automatically stopped under condition that the automatic stop time of the engine 10 is assumed to become short, thereby properly reducing degradation of the fuel saving benefit of the engine 10.

(5) As the stop time prediction process, if one or less of the last three values of the vehicle stop time are less than the short stop time Tshort, the process is performed to predict that the next automatic stop time of the engine 10 is the prescribed time or more. This makes it possible to predict, with a high degree of accuracy, whether or not the next automatic stop time of the engine 10 becomes short.

(6) As the stop time prediction process, if two of the last three values of the vehicle stop time are less than the short stop time Tshort and the other of the last three values of the vehicle stop time is the signal stop time or more, the process is performed to predict that the next automatic stop time of the engine 10 is the prescribed time or more. This makes it possible to predict, with a high degree of accuracy, whether or not the next automatic stop time of the engine 10 becomes short.

(7) As the stop time prediction process, if two of the last three values of the vehicle stop time are less than the short stop time Tshort and the last vehicle stop time but three is less than the short stop time, the process is performed to predict that the next automatic stop time of the engine 10 is the prescribed time or less. This makes it possible to predict, with a high degree of accuracy, whether or not the next automatic stop time of the engine 10 becomes short.

(8) The stop condition of the engine 10 includes the condition that the running speed V of the engine 10 is not more than the prescribed speed Vα that is more than zero. In this case, the engine 10 is easily automatically stopped under condition that the automatic stop time of the engine 10 becomes short, and then a situation in which the fuel saving benefit of the engine 10 is reduced occurs easily. Due to this, according to the present embodiment including the above condition concerning the running speed of the vehicle as the stop condition of the engine 10, utility value of the stop time prediction process and the automatic stop prohibition process is high.

(Second Embodiment)

Hereinafter, referring to the accompanying drawings, a control apparatus according to a second exemplary embodiment of the present invention will be described. In particular, differences from the above first exemplary embodiment will be mainly described.

Figure 14:
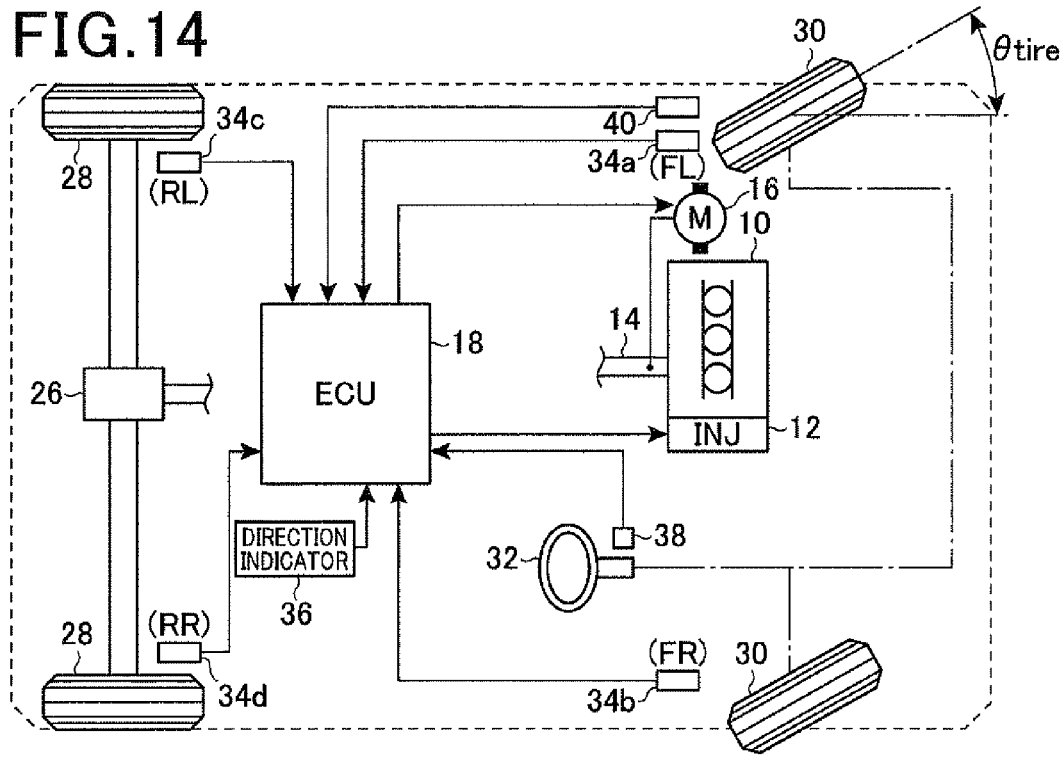
FIG. 14 is a diagram showing a system configuration of an on-vehicle engine system provided with a control apparatus for automatic stop of an engine according to a second exemplary embodiment of the present invention.

FIG. 14 shows a configuration of the on-vehicle engine system according to the present embodiment. In FIG. 14, the same elements as shown in FIG. 1 are conveniently provided with the same reference letters.

As shown in FIG. 14, the rotational force of the crankshaft 14 is transmitted to drive wheels (right and left rear wheels) 28 via a differential gear 26 and a drive shaft (not shown), etc.

In the vehicle, a steering wheel 32 is disposed so as to steer a steered wheels 30 (right and left front wheels that can be steered) 30. A turning angle θtire of the steered wheels 30 is determined by a steering amount of the steering wheel 32. Specifically, the more the steering amount becomes, the more the turning angle θtire becomes.

Near to each of the wheels (the drive wheels 28 and the steered wheels 30), wheel speed sensors 34a-34d is disposed so as to detect a rotational speed of the wheels. In the present embodiment, each of the wheel speed sensors 34a-34d for detecting a rotational speed of each of a front left wheel, a front right wheel, a rear left wheel, and a rear right wheel is referred to as "FL sensor 34a", "FR sensor 34b", "RL sensor 34c", and "RR sensor 34d".

The ECU 18 receives output signals from, e.g., a direction indicator 36, a steering amount sensor 38, a turning angle sensor 40, and each of the wheel speed sensors 34a-34d. The direction indicator 36 is operated by a driver so as to turn a direction indication light on and off. The steering amount sensor 38 detects a steering amount of the steering wheel 32. The turning angle sensor 40 detects a turning angle θtire of the steered wheel 30.

When the vehicle enters the non-arterial road from the arterial road, it may be impossible to properly predict whether or not the next automatic stop time is less than the prescribed time based on the history of the vehicle stop time Tstop. This is based on that at least the last three vehicle stop time Tstop in the non-arterial road is required to judge that the vehicle enters the non-arterial road.

When it is impossible to properly predict whether or not the next automatic stop time is less than the prescribed time, if the automatic stop condition is satisfied during a period from when the vehicle enters the non-arterial road to when the last three vehicle stop time Tstop are stored in the memory of the ECU 18, the engine 10 is automatically stopped. That is, each time the vehicle enters the non-arterial road from the arterial road, even if there is a situation where, after that, the vehicle is in a short stop, the automatic stop of the engine 10 is permitted continuously up to three times.

Figure 15:
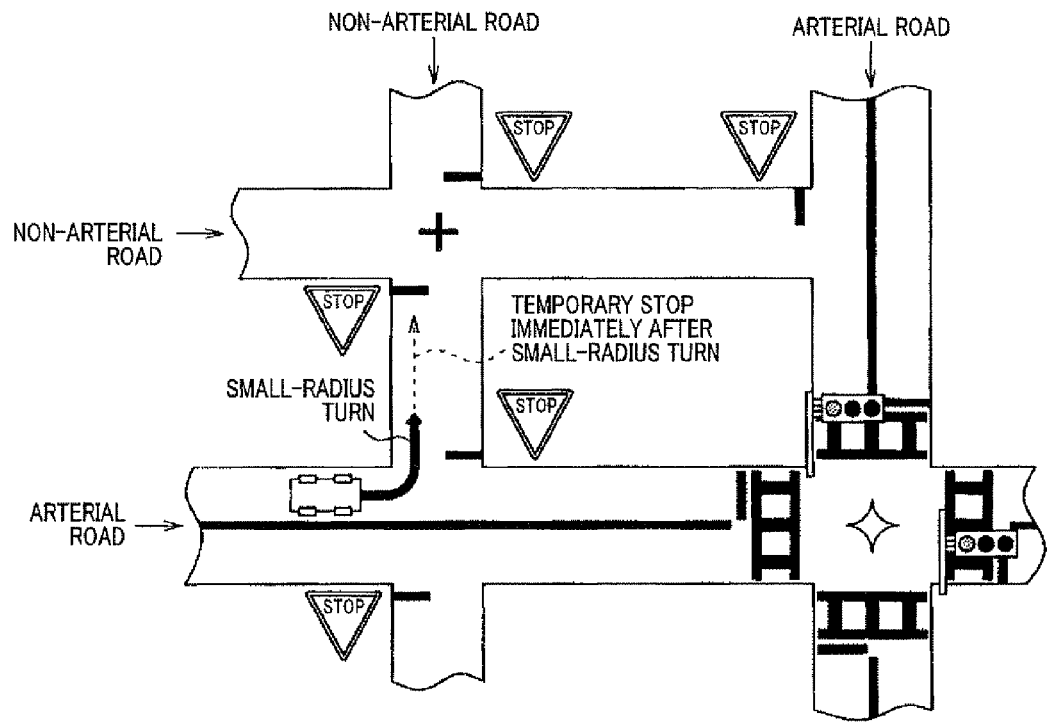
FIG. 15 is a diagram showing a situation where the vehicle enters non-arterial road though arterial road according to the second exemplary embodiment.

Here, the inventors noticed that, as shown in FIG. 15, when the vehicle enters the non-arterial road from the arterial road, the vehicle turns in a small radius to turn right or left (a revolution angle of the vehicle becomes large), and further noticed that such a small-radius turn is realized by increasing the steering amount of the steering wheel 32. From this, the inventors obtained knowledge that, as a parameter for judging that the vehicle enters the non-arterial road from the arterial road, it is possible to use the steering amount.

In the present embodiment, under condition that the vehicle turns in a small radius based on the steering amount, it is judged that a probability that the vehicle enters the non-arterial road from the arterial road is high, the next automatic stop of the engine 10 is prohibited. According to this, after the vehicle enters the non-arterial road, even if there is a situation where the vehicle is in a short stop), a situation where the engine 10 is automatically stopped is reduced.

Figure 16:
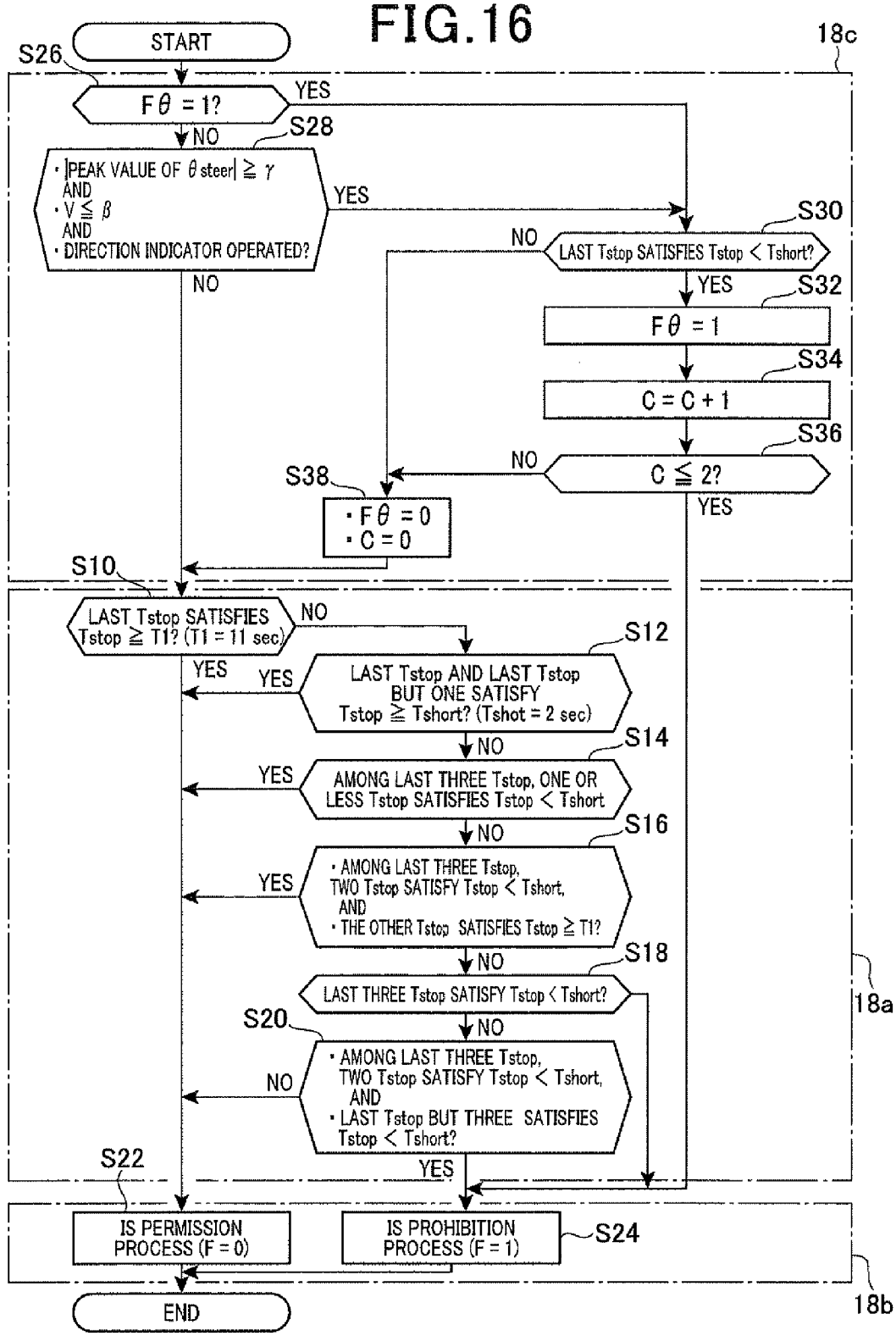
FIG. 16 is a flowchart showing steps of a stop time prediction process and an automatic stop prohibition process according to the second exemplary embodiment.

FIG. 16 shows the steps of a stop time prediction process and an automatic stop prohibition process according to the present embodiment. These processes are repeatedly executed at, for example, a predetermined cycle by the ECU 18. In FIG. 16, the same processes as shown in FIG. 6 are conveniently provided with the same step number. In addition, an initial value of the following non-arterial entrance flag Fθ and counter C is set to "0". In the present embodiment, the short stop time Tshort is set to four seconds. In FIG. 16, the ECU 18 functionally includes, in addition to the above prediction unit 18a and prohibition unit 18b, a small-radius turn judgment unit 18c that performs the following steps S26-S38. The small-radius turn judgment unit 18c corresponds to a small-radius turn judgment unit included in a control apparatus according to the present embodiment.

In the series of processes, the ECU 18 judges whether or not a value of the non-arterial entrance flag Fθ is "1" at step S26. Here, the value of the non-arterial entrance flag Fθ is "1" and "0", where "1" represents that it is finally judged that a probability that the vehicle enters the non-arterial road from the arterial road is high, and "0" represents that it is judged that a probability that the vehicle enters the non-arterial road is low. This value of the non-arterial entrance flag Fθ is stored in a nonvolatile memory such as an EEPROM (electrically erasable and programmable read only memory) of the ECU 18.

If the ECU 18 judges NO at step S26, the ECU 18 proceeds to step S28 and judges whether or not the following information (history information) is stored in the memory of the ECU 18. The information represents that the following condition is satisfied. This condition is that a logical addition of the following three conditions is true. The first condition is that an absolute value of a peak value in the steering amount θsteer, which is calculated based on an output value of the steering amount sensor 38, is a prescribed steering amount γ (>0) or more. The second condition is that the running speed of the vehicle is a predetermined low speed Vβ (>0) or less. The third condition is that the direction indicator 36 is operated.

This process is a process to judge whether or not a probability that the vehicle enters the non-arterial road from the arterial road is high, combined with the following process of step S30. Here, the above peak value is a difference between a reference value of the steering amount θsteer (e.g., a steering amount of "0" when the vehicle travels straight) and a maximum value of the steering amount θsteer when the vehicle turns left or right.

The above first condition concerning the steering amount θsteer is a condition on which is based when the ECU 18 judges whether or not the vehicle turns in a small radius. Hereinafter, referring to FIG. 17, the reason why it is possible to judge whether or not the vehicle turns in a small radius based on the steering amount θsteer will be described.

Figure 17:
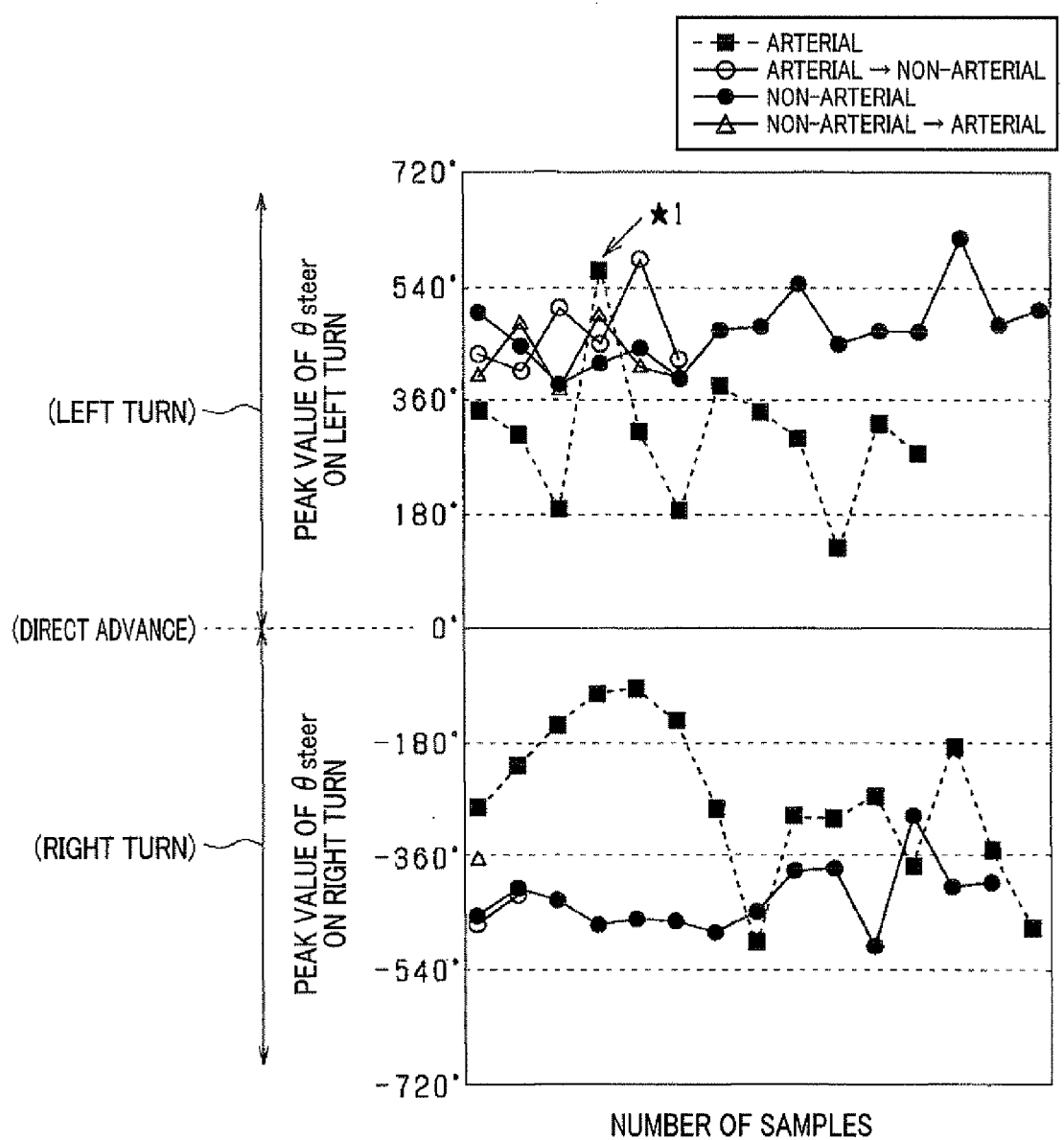
FIG. 17 is a diagram showing results of measurement of a steering amount when the vehicle enters the non-arterial road according to the second exemplary embodiment.

FIG. 17 shows measurement results of the peak value in the steering amount θsteer in various running conditions. Specifically, FIG. 17 shows, under condition that the vehicle drives along a predetermined route where an arterial road and a non-arterial road is located in a mixed manner, the above peak values (expressed by "■") when the vehicle drives on the arterial road and when the vehicle enters the non-arterial road approximately perpendicular to the arterial road from the arterial road (expressed by "○") in measured order. In addition, FIG. 17 also shows the peak values (expressed by "●") when the vehicle drives on the non-arterial road and the peak values (expressed by "Δ (white triangle)") when the vehicle returns to the arterial road from the non-arterial road. In FIG. 17, the peak value expressed by "*(black star mark) 1" is large because the vehicle drives on the arterial road where the radius of curvature is excessively small.

In both when the vehicle turns right and when the vehicle turns right, FIG. 17 shows a trend where the absolute values of the peak values (expressed by "○") in the steering amount θsteer when the vehicle enters the non-arterial road from the arterial road are larger than the absolute values of the peak values (expressed by "■") when the vehicle drives on the arterial road. From this, according to the peak values in the steering amount θsteer, it is possible to discriminate whether or not a probability that the vehicle enters the non-arterial road from the arterial road is high. Here, the prescribed steering amount γ is set to a value capable of distinguish between the peak values when the vehicle enters the non-arterial road from the arterial road and the peak values when the vehicle drives on the arterial road.

The above second condition concerning the running speed V of the vehicle is a condition that aims at improving judgment accuracy when the ECU 18 judges whether or not a probability that the vehicle enters the non-arterial road is high. Here, the reason why the judgment accuracy can be improved is based on that, when the vehicle enters the non-arterial road, the vehicle usually decelerates. In the present embodiment, the above predetermined low speed Vβ is set to a speed that is higher than the above prescribed speed Vα.

The above third condition concerning the direction indicator 36 is a condition that aims at improving judgment accuracy when improving judgment accuracy when the ECU 18 judges whether or not a probability that the vehicle enters the non-arterial road is high, which is the same as the second condition concerning the running speed V. That is, even if the absolute values of the peak value in the steering amount θsteer becomes large, there is no situation where the vehicle enters the non-arterial road from the arterial road, but there is a situation where the vehicle drives on the arterial road that is small in the radius of curvature. In this case, the ECU 18 may misjudge that the vehicle drives on the non-arterial road. Due to this, the condition concerning the direction indicator 36 is set and then avoids such misjudgment to improve the above judgment accuracy.

Referring again to FIG. 16, if the ECU 18 judges YES at step S26 or S28, the ECU 18 proceeds to step S30 and judges whether or not the last vehicle stop time Tstop is less than the short stop time Tshort. This process is based on the following two reasons.

The first reason is to further improve judgment accuracy when the ECU 18 judges whether or not a probability that the vehicle enters the non-arterial road is high, which is the same as the third condition concerning the direction indicator 36. That is, as shown in FIG. 15, in the non-arterial road that, after turning in a small radius, the vehicle enters, a probability that the vehicle is in a short stop according to e.g., a "stop" sign at an intersection is high. Due to this, under condition that the ECU 18 judges that the above history information is stored in the memory at step S28, if the ECU judges that the vehicle is in a short stop at step S30, the ECU 18 finally judges that a probability that the vehicle enters the non-arterial road is high.

The second reason is to judge whether or not there is a situation where a probability that the vehicle continues to drive on the non-arterial road is high.

If the ECU 18 continues to judge YES at step S30 second (or third) times, or under condition that the non-arterial entrance flag Fθ is set to "1", judges NO at step S30, the above history information stored in the memory is deleted.

If the ECU 18 judges YES at step S30, the ECU 18 proceeds to step S32 and set the non-arterial entrance flag Fθ to "1". This process is to avoid a situation where the engine 10 is automatically stopped during a period in which the ECU 18 cannot properly predict whether or not the next automatic stop time is less than the prescribed time, after first the ECU 18 judges YES at step S30, under condition that the ECU 18 judges that the above history information is stored in the memory at step S28, combined with the following processes of step S34 and S36.

As described above, three vehicle stop time Tstop after the vehicle enters the non-arterial road is needed to predict whether or not the next automatic stop time is less than the prescribed time. Due to this, even after the vehicle enters the non-arterial road, the next automatic stop time cannot be properly predicted until new three vehicle stop time Tstop are obtained (stored in the memory).

Here, it is considered that, after the ECU 18 judges YES at step S28, a situation where the vehicle stop time Tstop is less than the short stop time Tshort is a situation where a probability that the vehicle continues to drive on the non-arterial road. Due to this, after the ECU 18 judges YES at step 28, the following processes leading to the process of the step 24 are performed until new three vehicle stop time Tstop are stored in the memory.

At next step S34, the ECU 18 increment the value of the counter C by 1.

At next step S36, the ECU 18 judges whether or not the value of the counter C is "2" or less. This process is a process to judge whether or not three vehicle stop time Tstop needed to predict whether or not the next automatic stop time is less than the prescribed time are stored in the memory, after the ECU 18 judges YES at 28. This is based on that, if there are three vehicle stop time Tstop after the vehicle enters the non-arterial road, it is possible to leave the series of processes of step S26-S36 and to judge whether or not the vehicle drives on the non-arterial road in the process of step S18.

If the ECU 18 judges YES at step S36, the ECU 18 proceeds to step S24 and performs the IS prohibition process.

In contrast, the ECU 18 judges NO at step S30 or S36, the ECU 18 step S38 and initializes the values of the non-arterial entrance flag Fθ and the counter C (set them to "0"). That is, after the above history information is stored in the memory, if the ECU 18 judges that the last three vehicle stop time Tstop are stored in the memory, or that there is no situation where a probability that the vehicle continues to drive on the non-arterial road is high, the ECU 18 initializes the values of the non-arterial entrance flag Fθ and the counter C.

If the ECU 18 judges NO at step S28, or the process is completed, the ECU 18 proceeds to step S10.

If the process of step S22 or S24 is completed, the series of processes is temporarily ended.

FIG. 18 shows an example of the stop time prediction process and the automatic stop prohibition process. In FIG. 18, (a) an (h) corresponds to (b) and (c) of FIG. 2, respectively, (c) shows a change in the steering amount θsteer, (d) shows a change in values of the non-arterial entrance flag Fθ, and (e) shows a change in values of an idle stop flag F.

In the example shown in FIG. 18, at time t1 to t2, the vehicle stops on the arterial road where its vehicle stop time (from time t1 to t2) is the signal stop time T1 or more. After that, the vehicle starts to drive and subsequently decelerates to enter the non-arterial road from the arterial road while the steering wheel 32 is operated. According to this, at time t3, under condition that the running speed V of the vehicle is the predetermined low speed Vβ or less, the ECU 18 judges that the peak value of the steering amount is the prescribed steering amount γ (e.g., 250 degrees) and then the above history information is stored in the memory.

Subsequently, at time t4, the entrance into the non-arterial road is completed, and at time t5 immediately after that, under condition that the brake operation is performed, the ECU 18 judges that the running speed V is the prescribed speed Vα is more and then the engine 10 is automatically stopped. After that, at time t6 when the brake operation is released, the engine 10 is restarted. Under this condition, the ECU 18 judges that the vehicle is in a short stop (i.e., the vehicle is stopped during a short time) to set the values of the non-arterial entrance flag Fθ and the idle stop flag F to "1" and then the automatic stop of the engine 10 is prohibited. Due to this, at time t7 after that, the automatic stop condition is satisfied again, but the ECU 18 judges that, after the history information is stored in the memory, three vehicle stop time Tstop are stored in the memory, and therefore, the automatic stop of the engine 10 is prohibited.

Figure 19A:
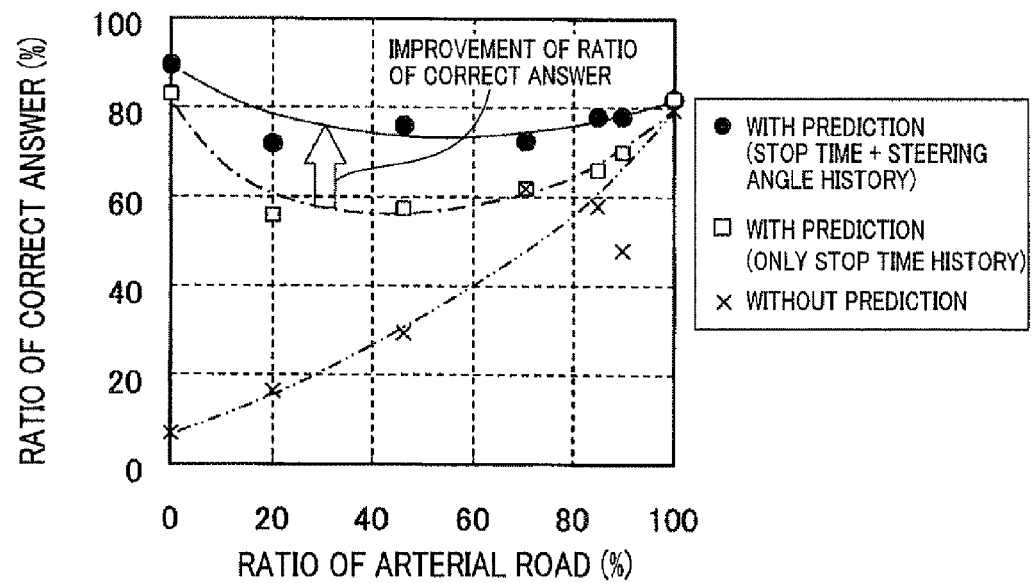
FIGS. 19A and 19B are a diagram showing effects of the stop time prediction process and an automatic stop prohibition process according to the second exemplary embodiment.
Figure 19B:
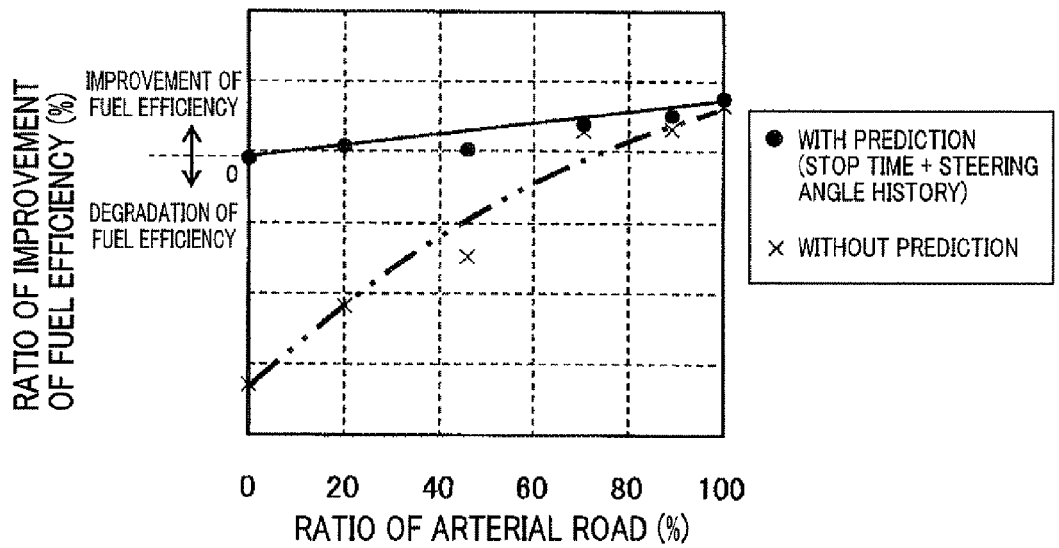
Figure 20:
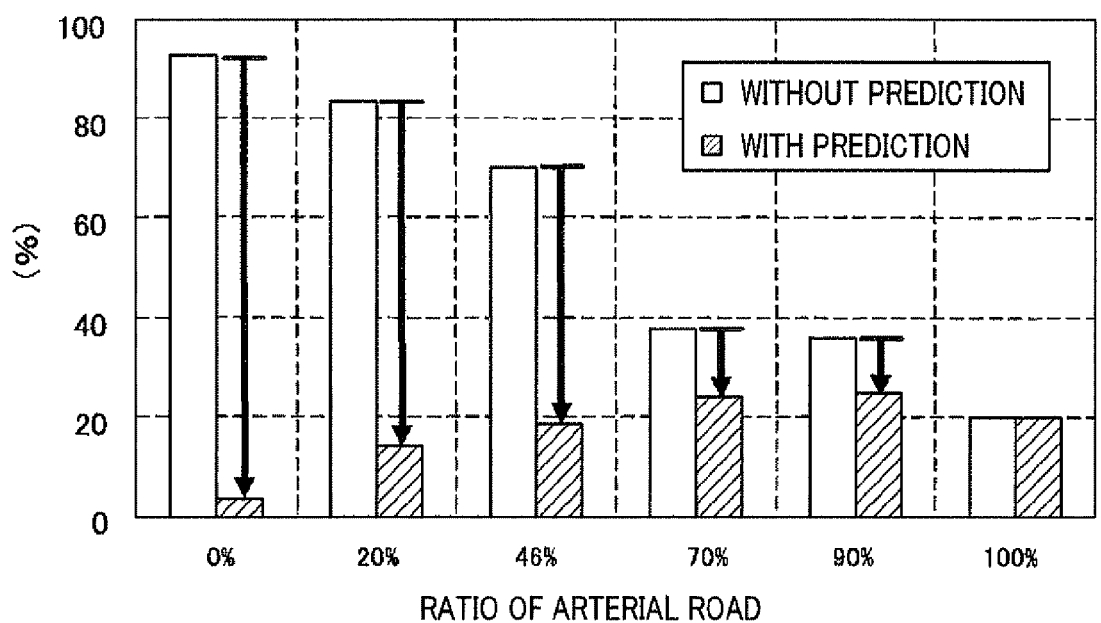
FIG. 20 is a diagram showing effects of the stop time prediction process and an automatic stop prohibition process according to the second exemplary embodiment.

FIGS. 19-20 show examination results of various effects induced by applying the stop time prediction process and the automatic stop prohibition process according to the present embodiment to the IS control on deceleration.

First, FIG. 19A shows a relation between a ratio of correct answer and a ratio of the arterial road, and FIG. 1913 shows a relation between a ratio of improvement of fuel efficiency and a ratio of the arterial road. In FIGS. 19A and 19B, "●" represents the results when the stop time prediction process and the automatic stop prohibition process according to the present embodiment are applied, "□" represents the results when the stop time prediction process, etc. according to the above first embodiment are applied, and "×" represents the results when these processes are not applied.

As shown in FIG. 19A, a technique for judging the entrance into the non-arterial road using. e.g., the steering amount θsteer is applied and then the ratio of correct answer is improved compared with the technique according to the first embodiment. In particular, improvement of the ratio of correct answer becomes large in the ratio of the arterial road of 20-80% where a degree of entrance into the non-arterial road from the arterial road is large. Due to this, as shown in FIG. 19B, while the ratio of improvement of fuel efficiency is maintained in an area where the ratio of the arterial road is high, it is possible to avoid a situation where the ratio of improvement of fuel efficiency is excessively reduced in an area where the ratio of the arterial road is low (the ratio of improvement of fuel efficiency can be near to zero).

Regarding the ratio of correct answer when the technique of the first embodiment, there is a difference between the results (expressed by "○") in FIG. 12 and the results (expressed by "□") in FIG. 19. The difference is induced by, e.g., changing the short stop time Tshort of two seconds to that of four seconds.

Next, FIG. 20 shows measurement results of a ratio of the number of idle stops where the automatic stop time is less than five seconds to all the number of idle stops due to the IS control on deceleration according to the present embodiment.

As shown in FIG. 20, when the stop time prediction process and the automatic stop prohibition process are not performed, the smaller the ratio of the arterial road becomes, the larger the ratio of the number of idle stops where the automatic stop time is less than five seconds to all the number of idle stops becomes. In contrast, when the stop time prediction process is performed by using, e.g., the steering amount θsteer, the ratio the ratio of the number of idle stops where the automatic stop time is less than five seconds to all the number of idle stops decreases, and then, the smaller the ratio of the arterial road, the larger a degree of such a decrease becomes. This makes it possible to decrease the ratio of the number of idle stops where the automatic stop time is less than five seconds near to the ratio in the arterial road (the ratio of the arterial road=100%) and then to properly reduce a decrease in the fuel saving benefit of the engine 10.

Figure 21A:
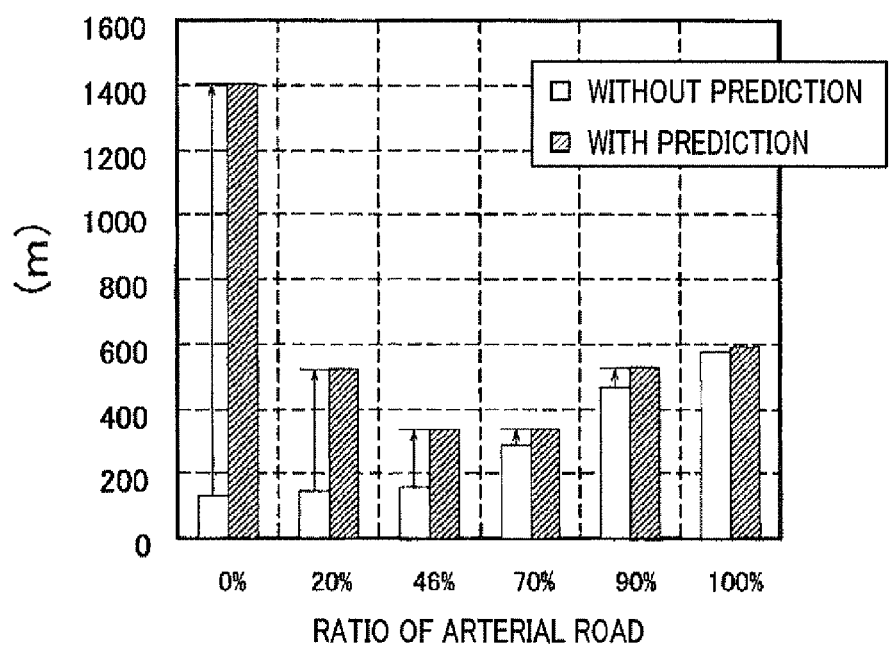
FIGS. 21A and 21B are a diagram showing effects of the stop time prediction process and an automatic stop prohibition process according to the second exemplary embodiment.
Figure 21B:
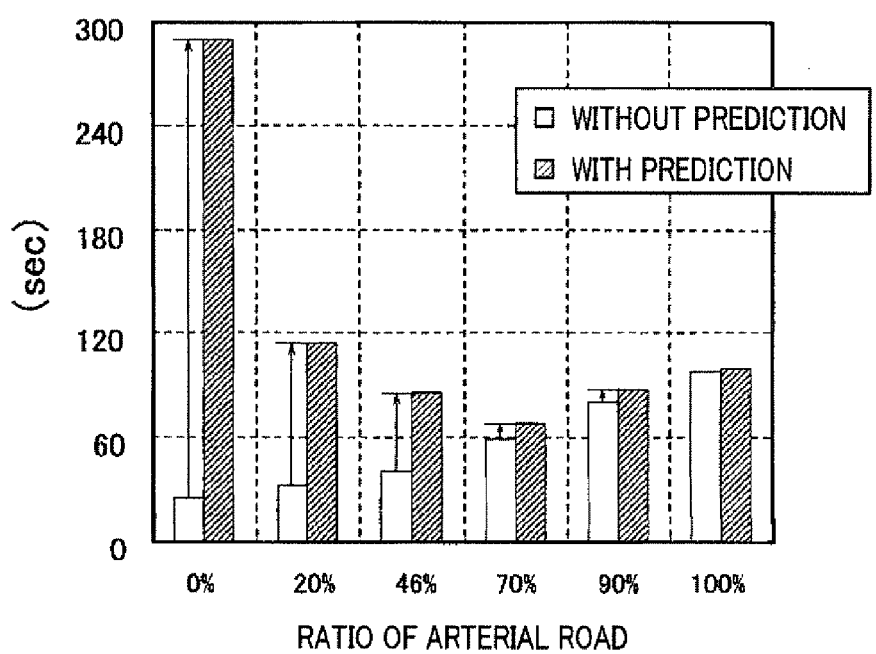

Subsequently, FIGS. 21A and 21B show measurement results of a travel distance (travel distance interval) and a travel time (travel time interval) of the vehicle from that a restart of the engine 10 to the next automatic stop of the vehicle, respectively.

As shown in FIGS. 21A and 21B, when the stop time prediction process and the automatic stop prohibition process are not performed, there is a trend where, the smaller the ratio of the arterial road, the shorter both the travel distance interval and the travel time interval become. Due to this, the smaller the ratio of the arterial road becomes, the more frequently the engine 10 is automatically stopped, and therefore, drivability may be reduced.

In contrast, when the stop time prediction process is performed by using e.g., the steering amount θsteer, the travel distance interval and the travel time interval are extended, and then, there is a trend where, the smaller the ratio of the arterial road, the lager a degree of such an extension becomes. This makes it possible to reduce occurrence of a situation where the engine 10 is frequently automatically stopped and to avoid the reduction of drivability.

In the present embodiment described in detail above, combined with the effects of the first embodiment, the following effects are obtained.

(9) If the ECU 18 judges that the above history information is stored in the memory and the last vehicle stop time Tstop is less than the short stop time Tshort, the ECU 18 performs the stop time prediction process to predict that the next automatic stop time of the engine 10 is less than the prescribed time. This makes it possible to properly judge that the vehicle enters the non-arterial road from the arterial road, and to predict, with a high degree of accuracy, whether or not a situation where next time the engine 10 is automatically stopped is a situation where the fuel saving benefit is reduced due to the automatic stop.

(10) Under condition that the above history information is stored in the memory, if the ECU 18 judges that the vehicle stop time Tstop is less than the short stop time Tshort, the ECU 18 predicts that the next automatic stop time is less than the prescribed time until new three vehicle stop time Tstop are stored in the memory. This makes it possible to prohibit the automatic stop of the engine during a period, which is after the vehicle enters the non-arterial road and before the ECU 18 can properly predict whether or not a situation where next time the engine 10 is automatically stopped is a situation where the fuel saving benefit is reduced due to the automatic stop.

(Other Embodiments)

The above embodiments can be modified as provided below.

The stop condition of the engine 10 is not limited to examples described in the above embodiments. For example, the condition concerning the running speed V of the vehicle may be a condition that the running speed V of the vehicle is zero. In this case, a frequency of occurrence of a situation where the automatic stop time of the engine 10 becomes a short time is low, but according to e.g., the stop time prediction process, a frequency of occurrence of a situation where the automatic stop time of the engine 10 becomes less than the prescribed time may be even lower. As another example, the stop condition may be a condition that a predetermined time passes after the vehicle stops. The purpose of the condition is to understand a user's intention to stop the vehicle as much as possible to enable the engine 10 to automatically stop, thereby avoiding occurrence of a situation where the automatic stop time of the engine 10 becomes a short time.

As the other example, the above stop condition may be a condition that the vehicle stops, and that a hydraulic (oil) pressure (e.g., a master cylinder pressure) of a brake system and a brake operation amount are a predetermined value or more. The purpose of the condition is to consider that, when the driver has an intention to stop the vehicle, the brake operation amount increases and the oil pressure of the brake rises, and to understand the user's intention to stop the vehicle as much as possible.

The restart condition of the engine 10 is not limited to examples described in the above embodiments. For example, the restart condition may be a condition including a condition that an accelerator operation is performed. Here, whether or not the accelerator operation is performed may be judged by e.g., judge whether or not an accelerator operation amount is more than zero.

In above embodiments, the history of the vehicle stop time is used to judge whether or not the next automatic stop time of the engine is the prescribed time or more, but the history is not limited to the vehicle stop time. For example, a history of the automatic stop time of the engine 10 may be used. A concrete prediction technique using the history of the automatic stop time will be described. The technique may perform a process to initialize the history of the automatic stop time stored in the memory of the ECU 18 each time the automatic stop of the engine 10 is prohibited (the above process of step S24 shown in FIG. 6 is performed), provided that, as the stop condition of the engine 10, a condition including a condition that the running speed of the vehicle becomes zero is applied, and the vehicle stop time and the automatic stop time are approximately identical to each other. According to the technique, compared with a technique using the history of the vehicle stop time, a frequency where the automatic stop time of the engine 10 becomes less than the prescribed time may be increased, and it is possible to obtain the fuel saving benefit due to the stop time prediction process and the automatic stop prohibition process.

When the history of the automatic stop time of the engine 10 is used, in steps S10-S20 shown in FIG. 6 or FIG. 16, or step S30 shown in FIG. 6, the automatic stop time may be used instead of the vehicle stop time Tstop.

The technique for predicting whether or not the next automatic stop time of the engine 10 is the prescribed time or more is not limited to examples described in the above embodiments. For example, instead of the processes of steps S12-S20 shown FIG. 6, if the ECU 18 judges that a majority of the last four values of the vehicle stop time is the short stop time Tshort, the ECU 18 may predict that the next automatic stop time of the engine 10 is the prescribed time or more. A plurality of the last values is not limited to the last four values, but may be the last three or five or more values.

The technique for continuing to predict that the next automatic stop time of the engine 10 is less than the prescribed time is not limited to an example described in the above second embodiment. For example, after the ECU 18 finally judges that a probability that the vehicle enters the non-arterial road from the arterial road is high (after the non-arterial entrance flag Fθ is set to "1"), as long as the ECU 18 judges that the vehicle stop time Tstop is less than the short stop time Tshort, until three new vehicle stop times Tstop are obtained (stored in the memory), the ECU 18 may continue to predict the next automatic stop time is less than the prescribed time. This is based on that, when three or more (i.e., a majority) of the last four vehicle stop time Tstop are less than the short stop time Tshort, it is possible to predict that the vehicle drives on the non-arterial road.

In the above embodiments, the prescribed time is longer than the short stop time Tshort. However, the prescribed time is not limited to examples described in the above embodiments. For example, the prescribed time may be the same time as the short stop time Tshort or may be shorter than the short stop time Tshort. In this case, provided that, for example, the short stop time Tshort is 2 sec. and the prescribed time is 1.6 sec., among the measurement results shown in FIG. 7A, most of the results, which show that the vehicle stop time becomes the short stop time Tshort, are less than one second. From this, if it is predicted that the next automatic stop time is less than the prescribed time, the automatic stop of the engine 10 is prohibited to reduce degradation of fuel saving benefit. The short stop time Tstop may be other than two or four seconds such as three seconds.

The idle stop control technique is not limited to examples described in the above embodiments. For example, under condition that the automatic stop of the engine 10 is prohibited by the automatic stop prohibition process and the vehicle is stopped, if it is judged that a long time (predetermined time) passes after a stop of the vehicle or a driver has an intention to stop the vehicle, the automatic stop of the engine 10 may be permitted. According to this, even if it would otherwise be predicted that the next automatic stop time is less than the prescribed time and the automatic stop of the engine 10 is prohibited, it is possible to reduce degradation of fuel saving benefit. Whether or not the driver has an intention to stop the vehicle may be judged based on, for example, whether or not a hydraulic pressure of a brake system is the prescribed pressure or more.

The technique for judging whether or not the vehicle turns in a small radius based on detection values from on-board sensors (e.g., steering amount sensor 38) that detects behaviors of the vehicle without communicating with the outside of the vehicle is not limited to an example described in the above second embodiment. For example, it may be judged whether or not the vehicles turns in a small radius based on the turning angle θtire calculated by output values from the turning angle sensor 40. Specifically, if an absolute value of a peak value in the turning angle θtire is a prescribed value or more, it may be judged that the vehicle turns in a small radius. As another example, detection unit (e.g., yaw rate sensor) for detecting a turning angular velocity of the vehicle may be used to judge that the vehicle turns in a small radius if an absolute value of a turning angle (e.g., yaw angle) calculated by time integration values of detection values from the detection unit is a prescribed angle or more.

Further, for example, it may be judged whether or not the vehicle turns in a small radius based on that, for example, an absolute value of a rotational speed difference between wheels that are placed at diagonal positions to each other is a threshold value or less. Here, the rotational speed difference between wheels at diagonal positions may be at least one of a difference between a rotational speed of the front left wheel calculated by an output values from FL sensor 34a and a rotational speed of the rear right wheel calculated by an output values from RR sensor 34d (hereinafter referred to as "FL-RR wheel speed difference") and a difference between a rotational speed of the front right wheel calculated by an output values from FR sensor 34d and a rotational speed of the rear left wheel calculated by an output values from RL sensor 34c (hereinafter referred to as "FR-RL wheel speed difference"). Hereinafter, referring to FIG. 22, the reason why it can be judged whether or not the vehicle turns in a small radius based on these wheel speed differences will be described.

FIG. 22 shows a relation between (a) the FL-RR wheel speed difference and FR-RL wheel speed difference and (b) the peak values of the steering amount θsteer, when the vehicle drives along a predetermined route where an arterial road and a non-arterial road are located in a mixed manner. In the FIG. 22, the FL-RR wheel speed difference is a value calculated by subtracting the rotational speed of the rear right wheel from the rotational speed of the front left wheel, and FR-RL wheel speed is a value calculated by subtracting the rotational speed of the rear left wheel from the rotational speed of the front right wheel difference.

FIG. 22 shows a trend where, on a right turn of the vehicle, the larger the peak value of the steering amount θsteer becomes, the larger the FL-RR wheel speed difference becomes, and on a left turn of the vehicle, the larger the peak value of the steering amount θsteer becomes, the larger the FR-RL wheel speed difference becomes. That is, there is a positive correlation between the peak value of the steering amount θsteer and these wheel speed differences. This makes it possible to judge whether or not the vehicle turns in a small radius based on the FL-RR wheel speed difference and/or the FR-RL wheel speed difference.

In addition, FIG. 23 shows a trend where, on both of the right turn and the left turn, both of the FL-RR wheel speed difference and/or the FR-RL wheel speed difference become a maximum value at approximately the same timing. From this, it may be judged that the vehicle turns in a small radius based on that, the largest value among the absolute values of these wheel speed differences becomes the above threshold value or less. This makes it possible to improve detection accuracy of small-radius turn of the vehicle.

The parameter for judging whether or not the vehicle turns in a small radius is not limited to the above rotational speed difference of wheels at diagonal positions to each other, but may be a rotational speed difference between two front wheels or a rotational speed difference between two rear wheels.

Figure 24A:
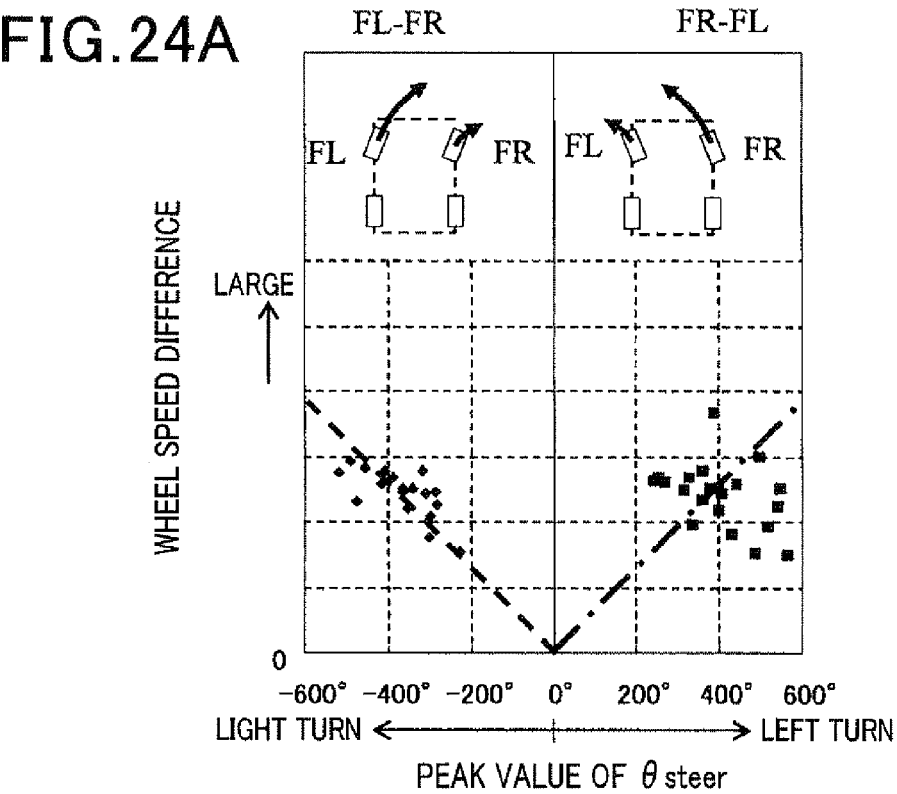
FIGS. 24A and 24B are a diagram showing correlation between the steering amount and the wheel speed difference according to the other exemplary embodiment.
Figure 24B:
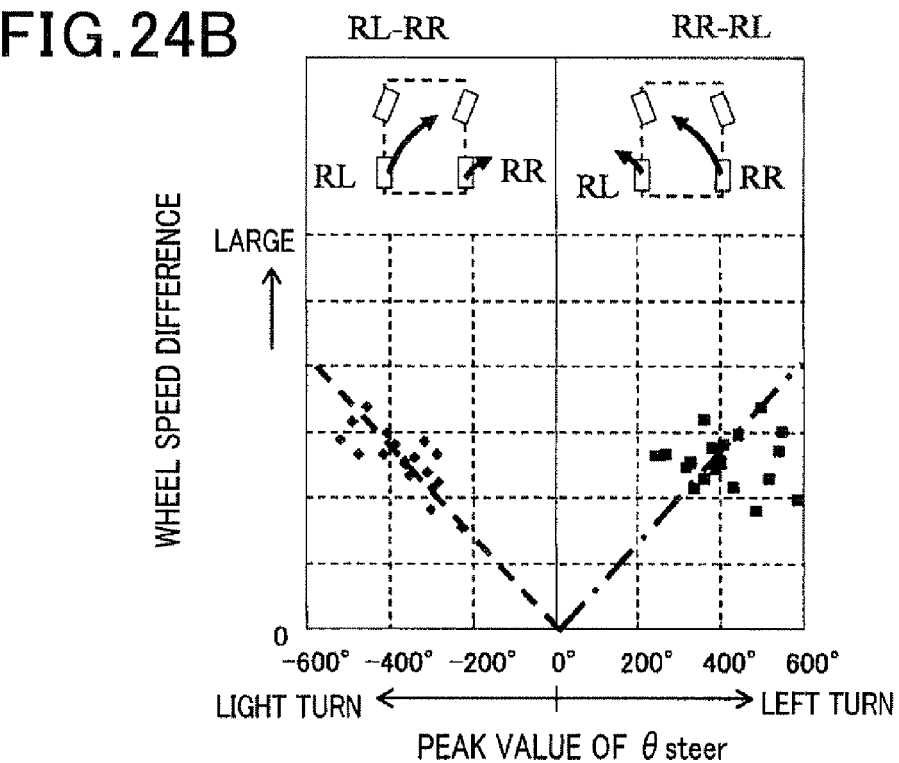

In particular, as shown in FIG. 24A, the above parameter may be at least one of a value calculated by subtracting the rotational speed of the front left wheel from the rotational speed of the front right wheel (FL-FR wheel speed difference) or a value calculated by subtracting the rotational speed of the front right wheel from the rotational speed of the front left wheel (FR-FL wheel speed difference). In addition, as shown in FIG. 24B, the above parameter may be at least one of a value calculated by subtracting the rotational speed of the rear left wheel from the rotational speed of the rear right wheel (RL-RR wheel speed difference) or a value calculated by subtracting the rotational speed of the rear right wheel from the rotational speed of the rear left wheel (RR-RL wheel speed difference). In this case, a correlation between the peak value of the steering amount θsteer and these wheel speed differences is weaker than that shown in FIG. 22, but it can be judged whether or not the vehicle turn in a small radius based on these rotational speed difference between front wheels and/or the rotational speed difference between rear wheels. This technique is effective in being applied to vehicles with a wheel speed sensor which is disposed in only front wheels or only rear wheels.

The technique for finally judging whether or not a probability that the vehicle enters the non-arterial road from the arterial road is high is not limited to an example described in the above second embodiment. For example, if it may be finally judged that a probability that the vehicle enter the non-arterial road is high, if it is judged that a history information is stored in the memory, wherein the history information is that only a condition that the absolute value of the peak value of the steering amount θsteer is the prescribed value or more is satisfied. In this case, for example, under condition that the automatic stop condition immediately after entering the non-arterial road from the arterial road is satisfied, it is possible to promptly prohibit the automatic stop of the engine 10. In particular, such judgment technique is effective in being applied to vehicles (e.g., home delivery vehicle) used for pickup and delivery services via the non-arterial road with many left and right turns.

Here, in such vehicles, after it is judged that a probability that the vehicle enters the non-arterial road is high, unit next it is judged that a probability that the vehicle drives on the arterial road is high, the ECU 18 may continue to prohibit the automatic stop of the engine 10. That is, after it is judged that a probability that the vehicle enters the non-arterial road is high, if it is judged that a probability that the vehicle drives on the arterial road is high, the ECU 18 may permit the automatic stop of the engine 10. This makes it possible to reduce occurrence of a situation where noise on a restart of the engine 10 causes hard ship for a person in a neighboring residence under condition that the vehicle travels on a non-arterial road in a residential area.

In this case, it is assumed that the automatic stop of the engine 10 immediately after the vehicle exits the non-arterial road to the arterial road is prohibited. Under this condition, it is assumed that the automatic stop is not permitted until the vehicle stop time Tstop becomes the signal stop time T1. In this case, after the vehicle exits the non-arterial road to the arterial road, where it is judged that a probability that the vehicle drives on the arterial road is continuously high, for example, the vehicle drives on an expressway for a long time, it may be wrongly predicted that the next automatic stop time becomes short. Further, though a long time passes after the vehicle exits the non-arterial road, the automatic stop is not performed, and therefore, a feeling of strangeness for a driver may be caused.

In order to solve these problems, it is preferable to permit the automatic stop of the engine 10, if it is judged that a probability that the vehicle drives on the arterial road after entering the non-arterial road is high based on a history of the running speed of the vehicle. An example of a concrete judgment technique using the history of the running speed may judge that a probability that the vehicle drives on the arterial road is high, if it is judged that the running speed of the vehicle is a predetermined high speed (e.g., high speed that cannot be expected in case of the non-arterial road, for example, 50-60 km/h) or more.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A control apparatus for controlling an automatic stop of an engine mounted on a vehicle so as to automatically stop the engine if a predetermined stop condition is satisfied, the stop condition including a condition that a running speed of the vehicle is a prescribed speed or less, the control apparatus comprising:
    a prediction unit that predicts whether or not the next automatic stop time of the engine is less than a prescribed time capable of obtaining a fuel saving benefit based on a history of a vehicle stop time or a history of an automatic stop time of the engine; and
    a prohibition unit that prohibits the next automatic stop of the engine if the prediction unit predicts that the next automatic stop time of the engine is less than the prescribed time.

2. The control apparatus according to claim 1, wherein
    the prediction unit predicts that the next automatic stop time of the engine is the prescribed time or more if the last value of the vehicle stop time or the automatic stop time of the engine is a predetermined signal stop time or more.

3. The control apparatus according to claim 1, wherein
the prediction unit predicts whether or not the next automatic stop time of the engine is less than the prescribed time based on a plurality of the last values from the history of the vehicle stop time or from the history of the automatic stop time of the engine.

4. The control apparatus according to claim 2, wherein
the prediction unit predicts whether or not the next automatic stop time of the engine is less than the prescribed time based on a plurality of the last values from the history of the vehicle stop time or from the history of the automatic stop time of the engine.

5. The control apparatus according to claim 4, wherein
the prediction unit predicts that the next automatic stop time of the engine is the prescribed time or more if a half or more of the plurality of the last values from the history of the vehicle stop time or from the history of the automatic stop time of the engine is a predetermined short stop time or more, the short stop time being less than the signal stop time.

6. The control apparatus according to claim 3, wherein
the prediction unit predicts that the next automatic stop time of the engine is less than the prescribed time if the last three values from the history of the vehicle stop time or from the history of the automatic stop time of the engine are less than a predetermined short stop time.

7. The control apparatus according to claim 3, wherein
the prediction unit predicts that the next automatic stop time of the engine is the prescribed time or more, if two of the last three values from the history of the vehicle stop time or from the history of the automatic stop time of the engine are less than a predetermined short stop time and the other of the last three values is a predetermined signal stop time or more, the signal stop time being more than the short stop time.

8. The control apparatus according to claim 3, wherein
the prediction unit predicts that the next automatic stop time of the engine is less than the prescribed time, if two of the last three values from the history of the vehicle stop time or from the history of the automatic stop time of the engine are less than a predetermined short stop time and the last value but three is less than the short stop time.

9. The control apparatus according to claim 1, further comprising
a small-radius turn judgment unit that judges whether or not the vehicle turns in a small radius based on a detection value of a behavior of the vehicle detected by an on-board sensor mounted on the vehicle,
wherein the prediction unit predicts that the next automatic stop time of the engine is less than the prescribed time if the small-radius turn judgment unit judges that the vehicle turns in a small radius.

10. The control apparatus according to claim 9, wherein
the prediction unit predicts that the next automatic stop time of the engine is less than the prescribed time, if a running speed of the vehicle is a prescribed low speed or less and the small-radius turn judgment unit judges that the vehicle turns in a small radius.

11. The control apparatus according to claim 9, wherein
the prediction unit predicts that the next automatic stop time of the engine is less than the prescribed time, if a vehicle stop time or an automatic stop time of the engine, which is immediately after the small-radius turn judgment unit judges that the vehicle turns in a small radius, is less than a predetermined short stop time.

12. The control apparatus according to claim 9, wherein
the prediction unit predicts that the next automatic stop time of the engine is less than the prescribed time if a majority of a predetermined number of the last values from the history of the vehicle stop time or from the history of the automatic stop time of the engine is less than a predetermined short stop time, the predetermined number being three or more, and continues to predict that the next automatic stop time of the engine is less than the prescribed time until the predetermined number of the last values of the vehicle stop time or the automatic stop time of the engine is newly obtained, if the vehicle stop time or the automatic stop time of the engine is less than the short stop time after the small-radius turn judgment unit judges that the vehicle turns in a small radius.

13. The control apparatus according to claim 12, wherein
the prediction unit predicts that the next automatic stop time of the engine is less than the prescribed time if the last three values from the history of the vehicle stop time or from the history of the automatic stop time of the engine are less than a predetermined short stop time, and continues to predict that the next automatic stop time of the engine is less than the prescribed time until the predetermined number of the last values of the vehicle stop time or the automatic stop time of the engine is newly obtained, if the vehicle stop time or the automatic stop time of the engine is less than the short stop time after the small-radius turn judgment unit judges that the vehicle turns in a small radius.

14. The control apparatus according to claim 9, wherein
the a small-radius turn judgment unit judges whether or not the vehicle turns in a small radius based on at least one of a steering amount of a steering unit operated by a driver to steer a steered wheel of the vehicle and a difference between a rotational speed of an outer wheel and a rotational speed of an inner wheel.

15. The control apparatus according to claim 9, wherein
the prediction unit predicts that the next automatic stop time of the engine is less than the prescribed time, if a direction indicator of the vehicle is operated and the small-radius turn judgment unit judges that the vehicle turns in a small radius.

16. The control apparatus according to claim 1, wherein
the prescribed speed is a speed of more than zero.

17. An engine system, comprising:
an engine mounted on a vehicle; and
a control apparatus that controls an automatic stop of the engine so as to automatically stop the engine if a predetermined stop condition is satisfied, the stop condition including a condition that a running speed of the vehicle is a prescribed speed or less, wherein the control apparatus comprises:
a prediction unit that predicts whether or not the next automatic stop time of the engine is less than a prescribed time capable of obtaining a fuel saving benefit based on a history of a vehicle stop time or a history of an automatic stop time of the engine; and
a prohibition unit that prohibits the next automatic stop of the engine if the prediction unit predicts that the next automatic stop time of the engine is less than the prescribed time.

18. A control apparatus for controlling an automatic stop of an engine mounted on a vehicle so as to automatically stop the engine if a predetermined stop condition is satisfied, the stop condition including a condition that a running speed of the vehicle is a prescribed speed or less, the control apparatus comprising:

a prediction unit that predicts whether or not the next automatic stop time of the engine is less than a prescribed time capable of obtaining a fuel saving benefit based on a history of a vehicle stop time or a history of an automatic stop time of the engine; and a prohibition unit that prohibits the next automatic stop of the engine if the prediction unit predicts that the next automatic stop time of the engine is less than the prescribed time, wherein the prediction unit predicts whether or not the next automatic stop time of the engine is less than the prescribed time based on a plurality of the last values from the history of the vehicle stop time or from the history of the automatic stop time of the engine, and wherein the prediction unit predicts that the next automatic stop time of the engine is the prescribed time or more if a half or more of the plurality of the last values from the history of the vehicle stop time or from the history of the automatic stop time of the engine is a predetermined short stop time is more.

19. The control apparatus according to claim 18, wherein the prediction unit predicts that the next automatic stop time of the engine is the prescribed time or more if the last value and the last value but one from the history of the vehicle stop time or from the history of the automatic stop time of the engine are a predetermined short stop time or more.

20. The control apparatus according to claim 18, wherein the prediction unit predicts that the next automatic stop time of the engine is the prescribed time or more if one or less of the last three values from the history of the vehicle stop time or from the history of the automatic stop time of the engine are less than a predetermined short stop time.

* * * * *